(12) United States Patent
Durandet et al.

(10) Patent No.: US 10,996,843 B2
(45) Date of Patent: May 4, 2021

(54) SYSTEM AND METHOD FOR SELECTING GRAPHICAL OBJECTS

(71) Applicant: MyScript, Nantes (FR)

(72) Inventors: Mathieu Durandet, Nantes (FR); Baptiste Demarest, Nantes (FR)

(73) Assignee: MYSCRIPT, Nantes (FR)

( * ) Notice: Subject to any disclaimer, the term of this patent is extended or adjusted under 35 U.S.C. 154(b) by 0 days.

(21) Appl. No.: 16/715,960

(22) Filed: Dec. 16, 2019

(65) Prior Publication Data

US 2021/0089801 A1    Mar. 25, 2021

(30) Foreign Application Priority Data

Sep. 19, 2019   (EP) ..................................... 19306135

(51) Int. Cl.
| | |
|---|---|
| *G06F 3/0488* | (2013.01) |
| *G06K 9/20* | (2006.01) |
| *G06K 9/22* | (2006.01) |
| *G06K 9/62* | (2006.01) |
| *G06F 40/171* | (2020.01) |
| *G06K 9/00* | (2006.01) |

(52) U.S. Cl.
CPC .......... *G06F 3/0488* (2013.01); *G06F 40/171* (2020.01); *G06K 9/00402* (2013.01); *G06K 9/2081* (2013.01); *G06K 9/222* (2013.01); *G06K 9/623* (2013.01)

(58) Field of Classification Search
CPC ... G06F 40/171; G06F 3/0488; G06K 9/2081; G06K 9/00402; G06K 9/222; G06K 9/623
See application file for complete search history.

(56) References Cited

U.S. PATENT DOCUMENTS

| | | |
|---|---|---|
| 5,847,712 A | 12/1998 | Salesin |
| 5,867,596 A | 2/1999 | Kano et al. |
| 6,525,749 B1 | 2/2003 | Moran et al. |
| 6,647,145 B1 | 11/2003 | Gay |

(Continued)

FOREIGN PATENT DOCUMENTS

EP    1973063    1/2011

OTHER PUBLICATIONS

International Search Report for related Application No. PCT/EP2016/001720, dated Jan. 20, 2017, EPO-Internal WPI Data.

(Continued)

*Primary Examiner* — Ajay M Bhatia
*Assistant Examiner* — Mong-Shune Chung
(74) *Attorney, Agent, or Firm* — McDermott Will & Emery LLP

(57) ABSTRACT

The invention relates to a method on a computing device comprising: displaying in a display area graphical objects, this display area comprising a structured text section with text objects and block sections with text or non-text objects; locating an initiation point from which starts a user selection gesture; determining a selection path forming a selection area; and selecting each graphical object contained within the selection area. If the initiation point is located in the structured text section, a first mode may be selected thereby allowing the selection path to be drawn in the display area to select any graphical object. If the initiation point is located within a target block section among the block sections, a second mode may be selected, thereby confining the selection path within the target block section.

15 Claims, 16 Drawing Sheets

(56) References Cited

U.S. PATENT DOCUMENTS

| | | |
|---|---|---|
| 7,218,779 B2 | 5/2007 | Dodge |
| 7,298,903 B2 | 11/2007 | Wang et al. |
| 7,324,691 B2 | 1/2008 | Li et al. |
| 7,330,184 B2 | 2/2008 | Leung |
| 7,352,902 B2 | 4/2008 | Li et al. |
| 7,394,935 B2 | 7/2008 | Chen et al. |
| 7,440,616 B2 | 10/2008 | Li et al. |
| 7,496,232 B2 | 2/2009 | Bishop et al. |
| 7,616,333 B2 | 11/2009 | Wakeam et al. |
| 7,904,810 B2 | 3/2011 | Chen et al. |
| 7,945,097 B2 | 5/2011 | Biswas et al. |
| 8,014,607 B2 | 9/2011 | Saund et al. |
| 8,316,299 B2 | 11/2012 | Asaka |
| 8,718,375 B2 | 5/2014 | Ouyang et al. |
| 8,782,549 B2 | 7/2014 | Quyang |
| 9,171,204 B2 | 11/2015 | Acharya |
| 9,965,175 B2 | 5/2018 | Rucine et al. |
| 10,048,824 B2 | 8/2018 | Jung |
| 2003/0007683 A1 | 1/2003 | Wang |
| 2003/0215145 A1 | 11/2003 | Shilman et al. |
| 2004/0155869 A1 | 8/2004 | Robinson |
| 2004/0252888 A1 | 12/2004 | Bargeron |
| 2005/0063592 A1 | 3/2005 | Li et al. |
| 2005/0063594 A1 | 3/2005 | Li et al. |
| 2006/0061780 A1 | 3/2006 | Chen et al. |
| 2006/0098871 A1 | 5/2006 | Szummer |
| 2006/0210173 A1 | 9/2006 | Jurion |
| 2006/0218171 A1 | 9/2006 | Wakeman et al. |
| 2008/0195931 A1 | 8/2008 | Raghupathy |
| 2008/0232690 A1 | 9/2008 | Saund et al. |
| 2014/0143721 A1 | 5/2014 | Suzuki et al. |
| 2014/0177962 A1 | 6/2014 | Torgerson |
| 2014/0313216 A1 | 10/2014 | Steingrimsson |
| 2014/0325435 A1 | 10/2014 | Jung |
| 2015/0206005 A1 | 7/2015 | Jung |
| 2016/0147434 A1 | 5/2016 | Lee et al. |
| 2017/0068868 A1 | 3/2017 | Cartune |
| 2017/0109578 A1 | 4/2017 | Bednarowicz |
| 2019/0050116 A1 | 2/2019 | Kim et al. |

OTHER PUBLICATIONS

Plimmer et al., "Beautifying sketching-based design tool content: Issues and experiences," 6th Australasian User Interface Conference, 2005.

Wang et al., "Exploring sketch beautification techniques," CHINZ'05, Jul. 2005, pp. 15-16.

Fiser et al., "Shipshape: A drawing beautification assistant," The Eurographics Association 2015.

Extended European Search Report dated Mar. 25, 2020 in corresponding European Application No. 19306135.5.

MyScript, "MyScript—The Power of Handwriting", Dec. 11, 2014, pp. 1-3, XP054976902, URL:https://www.youtube.com/watch?v=yojFiBjPMUo, retrieved Nov. 10, 2016.

International Search Report dated Nov. 25, 2020 in International Application No. PCT/EP2020/076080.

SYSTEM AND METHOD FOR SELECTING GRAPHICAL OBJECTS

CROSS REFERENCE TO RELATED APPLICATIONS

This application claims priority to European Application No. 19306135.5, filed on Sep. 19, 2019, the entire contents of which is incorporated herein.

TECHNICAL FIELD

The present disclosure relates generally to the field of computing device interface capable of recognizing user input handwriting of various graphics and text. In particular, the present disclosure concerns computing devices and corresponding methods for detecting and processing input handwritten elements.

BACKGROUND

Computing devices continue to become more ubiquitous to daily life. They may take various forms such as computer desktops, laptops, tablet PCs, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Each type of computing device is equipped with particular computing resources and destined for given uses. Computing devices generally comprise of at least one processing element, such as a central processing unit (CPU), some form of memory, and input and output devices. The variety of computing devices and their subsequent uses necessitate a variety of input devices and interfaces to allow users to interact with their computing devices.

One such input device is a touch sensitive surface such as a touchscreen or touchpad wherein the user input is received through contact between a user body part (e.g. a finger) or an instrument (e.g. a pen or stylus), and the touch sensitive surface. Another input device is an input surface that senses gestures made by a user above the input surface. A further input device is a position detection system which detects the relative position of either touch or non-touch interactions with a non-touch physical or virtual surface.

Handwriting recognition can be implemented in computing devices to input and process various types of graphical objects (also called input elements), hand-drawn or handwritten by a user, such as text content (e.g., alphanumeric characters) or non-text content (e.g. shapes, drawings). Once inputted on a computing device, the input elements are usually displayed as digital ink and undergo handwriting recognition to be converted into typeset versions. The user handwriting input is typically interpreted using a real-time handwriting recognition system or method. To this end, either on-line systems (recognition carried out using a cloud-based solution or the like) or off-line systems may be used.

The user input may be drawings, diagrams or any other content of text, non-text or mixed content of text and non-text. Handwriting input may be made on a structured document according to guiding lines (base lines) which guide and constraint input by the user. Alternatively, a user may handwrite in free-mode, i.e. without any constraints of lines to follow or input size to comply with (e.g. on a blank page).

FIG. 1A shows an example of a computing device 1 comprising a display device 1 which displays digital ink graphical objects hand-drawn or handwritten by a user using an appropriate user interface. In the present case, the computing device 1 detects and displays text content 4 and 6 and non-text content 8, 10 and 12. Each of these elements is formed by one or more strokes of digital ink. As discussed later, text and non-text may each take various forms. Graphical objects may comprise text handwriting, diagrams, musical annotations, and so on . . . . In this example, the shape 8 is a rectangle or the like which constitutes a container (a box) containing text content 6 so that both elements 6 and 8 can be selected and manipulated together.

As mentioned earlier, handwriting recognition may be performed on text input elements. Handwriting recognition may also be performed on non-text input elements. In addition, each input element may be converted and displayed as typeset input elements, as depicted in this example in FIG. 1B.

The content depicted in FIGS. 1A-1B is a mere example and other elements, or other types or forms thereof, than those depicted may be present in addition to or as an alternative.

In handwriting recognition applications, it is usually possible to perform some level of editing on user input displayed on a computing device. Conventionally, such applications are however limited in their capabilities to handle editing functions and typically constrain users to adopt behaviors or accept compromises which do not reflect the user's original intent. As a result, some conventional handwritten recognition applications force users to navigate menus to select and edit ink elements.

Typically, the ability in conventional handwriting recognition applications to rearrange text or non-text ink input elements is limited where only certain operations are available, often involving complex or unnatural manipulations by the users. As such, it is generally difficult for users to edit text or non-text context in an ergonomic and efficient manner.

In particular, when various graphical objects are displayed on a screen, it is often difficult for a user to select graphical objects, for the purpose of editing for instance. Computing devices running handwriting recognition applications generally does not permit easy and intuitive selection of graphical objects. It is thus fastidious for users to manipulate text and non-text content displayed on a screen.

Improvements are desired to allow easy and intuitive selection of graphical objects (either text and/or non-text) on a computing device.

SUMMARY

The examples of the present invention that are described herein below provide computing devices, methods and corresponding computer programs for editing of input ink elements.

According to a particular aspect, the invention provides a computing device comprising:
- an input surface for hand-drawing graphical objects including text and non-text objects;
- a display device for displaying in a display area a plurality of said graphical objects in digital ink, said display area comprising: a structured text section containing at least one text object arranged according to a guideline pattern, and at least one block section, distinct from the structured text section, containing at least one text or non-text object;

a locating module for locating an initiation point in the display area from which starts a user selection gesture performed with the input surface to define a selection area; and a selection module for determining, based on the user selection gesture, a selection path forming said selection area in the display area and for selecting each graphical object contained at least partially within said selection area, said selection module being configured to operate as a function of said locating of the initiation point such that:

if the initiation point is located in the structured text section, the selection module operates according to a first mode by allowing the selection path to be drawn in the display area to select any graphical object of the structured text section and of said at least one block section; and if the initiation point is located within a target block section among said at least one block section, the selection module operates according to a second mode by confining the selection path within said target block section to prevent selection of any graphical object outside said target block section.

The present invention allows selecting and editing hand-drawn graphical objects in a flexible and efficient manner on a computing device. Two different operating modes are operable to allow the user to make an easy and accurate selection of any graphical objects that he may wish to manipulate for any appropriate purpose, such as editing or the like. In particular, the first mode allows a free and easy selection of any graphical objects present in a display area since no localization restriction is imposed on the selection path while the user selection part is being performed. On the other hand, the second mode permits a restricted selection within a particular block section in which the user selection gesture has started, thereby allowing a quick selection even if the user selection gesture performed by the user is not accurate.

Selection of graphical objects may be carried out without the need for complex or hard to remember gestures. The user may easily remember the procedure for performing a graphical object selection.

In a particular embodiment, in the first mode the selection module is configured to select any graphical object, within the structured text section and within said at least one block section, which is at least partially contained in said selection area.

In a particular embodiment, in the second mode the selection module is configured to authorize only selection of any graphical object within said target block section.

In a particular embodiment, the selection module is configured to determine a connection line joining the initiation point and an end point of the selection path to thereby form the selection area.

In a particular embodiment, the selection module is configured to: detect a current end point while the selection path is still being drawn; define dynamically the connection line joining the initiation point and the current end point; determine the selection area formed by the selection path and the connection line; and select each graphical object at least partially contained in said selection area.

In a particular embodiment, the selection path and the connection line are represented on the display device by two respective strokes of digital ink having a predefined stroke width, the selection area being defined collectively by the selection path and the connection line so that said selection area includes the area occupied by the selection path and the connection line.

In a particular embodiment, the selection module is configured, in the first and second mode, to select each graphical object which presents a relative proportion within the selection area exceeding a predetermined threshold.

In a particular embodiment, the display device is configured to generate a visual feedback for each graphical object being currently selected by the user selection gesture while the selection path is being drawn.

In a particular embodiment, the computing device comprises an edition module for editing collectively as a block each graphical object selected by the selection module.

In a particular embodiment, the user selection gesture is an interaction of a user's body part with the input surface which causes generation of a stroke of digital ink on the display device along the selection path.

In a particular embodiment, said at least one block section comprises at least one of the following: a drawing block section containing at least one drawing object; a mathematic block section containing at least one mathematic object representative of a mathematic formulation; and a diagram block section containing text and non-text objects.

In a particular embodiment, the computing device comprises a storing module for storing a respective rank for each of said graphical objects present in the display area, the ranks of said graphical objects being ordered according to a rank order, wherein the selection module is configured to: determine the rank of each graphical object currently being selected within the selection area; identify any not-yet-selected graphical object having a rank comprised between the respective ranks of two selected graphical objects according to said rank order; and include each identified graphical object into the selection.

In a particular embodiment, the structured text section forms a background of the display area with guidelines for guiding text input, and wherein the at least one block section is displayed over said background.

The present invention also relates to a corresponding method for processing handwriting input elements on a computing device of the invention. The computing device comprising a processor, a memory and at least one non-transitory computer readable medium for recognizing input under control of the processor. In particular, the invention concerns a method comprising:

displaying in a display area of a display device a plurality of graphical objects in digital ink, said display area comprising: a structured text section containing at least one text object arranged according to a guideline pattern, and at least one block section, distinct from the structured text section, containing at least one text or non-text object;

locating an initiation point in the display area from which starts a user selection gesture performed with the input surface to define a selection area;

determining, based on the user selection gesture, a selection path forming said selection area in the display area; and selecting each graphical object contained at least partially within said selection area;

wherein the selection path is determined as a function of a result of said locating such that: if the initiation point is located in the structured text section, operating according to a first mode by allowing the selection path to be drawn in the display area to select any graphical object of the structured text section and of said at least one block section; and if the initiation point is located within a target block section among said at least one block section, operating according to a second mode by confining the selection path within said target block section to prevent selection of any graphical object outside said target block section.

The various embodiments defined in the present document in connection with the computing device of the present invention apply in an analogous manner to the method, the computer program and the non-transitory computer readable medium of the present disclosure.

For each step of the method of the present invention as described in the present teachings, the computing device may comprise a corresponding module configured to perform said step.

According to another aspect, the present inventions relates to a non-transitory computer readable medium having recorded thereon a computer readable program code (or computer program) including instructions for executing the steps of the method of the invention as defined in the present document.

The computer program of the invention can be expressed in any programming language, and can be in the form of source code, object code, or any intermediary code between source code and object code, such that in a partially-compiled form, for instance, or in any other appropriate form.

The invention also provides a computer program as mentioned above.

The non-transitory computer readable medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance. The computer program according to the disclosure can in particular be downloaded from the Internet or a network of the like.

Alternatively, the non-transitory computer readable medium can correspond to an integrated circuit in which a computer program is loaded, the circuit being adapted to execute or to be used in the execution of the methods of the invention.

In a particular embodiment, the invention relates to a non-transitory computer readable medium having a computer readable program code embodied therein, said computer readable program code being adapted to be executed to implement a method on a computing device as defined in the present document, the computing device comprising a processor for executing the steps of said method.

BRIEF DESCRIPTION OF THE DRAWINGS

Other characteristics and advantages of the present disclosure will appear from the following description made with reference to the accompanying drawings which show embodiments having no limiting character. In the figures.

Figure 1A:
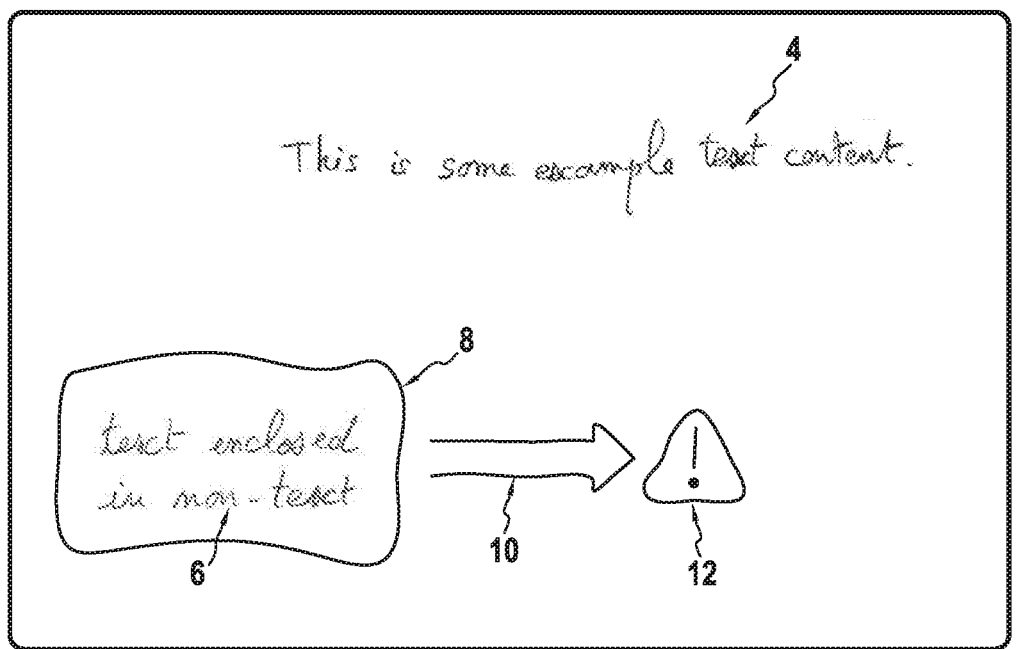
FIGS. 1A-1B represent a computing device according a conventional arrangement.
Figure 1B:
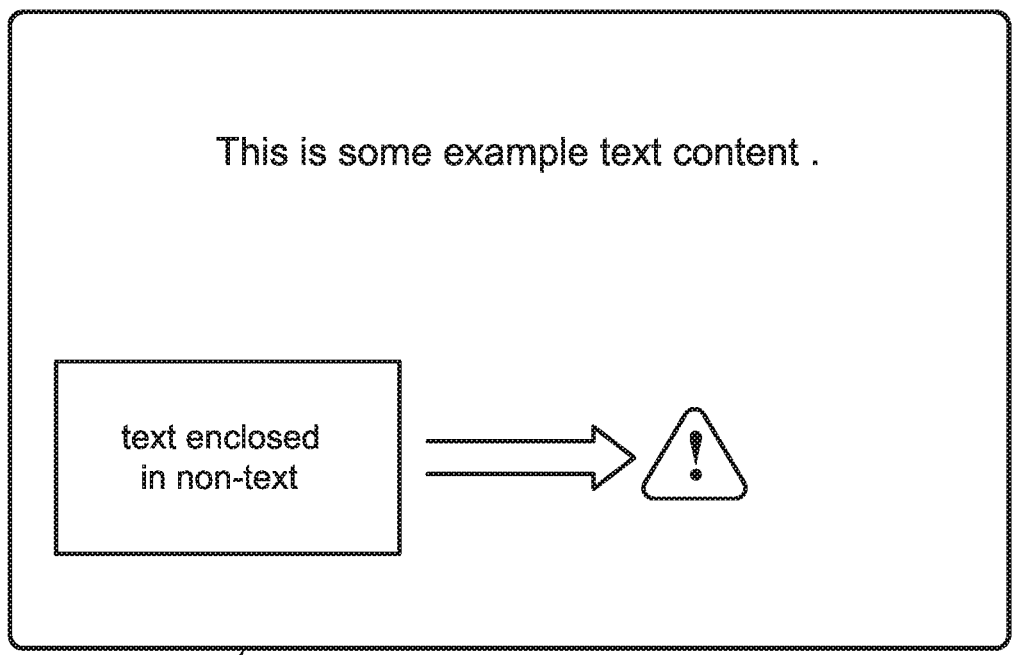

The components in the figures are not necessarily to scale, emphasis instead being placed upon illustrating the principles of the present invention.

For simplicity and clarity of illustration, the same reference numerals will be used throughout the figures to refer to the same or analogous parts, unless indicated otherwise.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known method, procedures, and/or components are described at a relatively high-level, without detail, in order to avoid unnecessarily obscuring aspects of the present teachings.

The following description of the exemplary embodiments refers to the accompanying drawings. The following detailed description does not limit the invention. Instead, the scope of the invention is defined by the appended claims. In various embodiments as illustrated in the figures, a computing device, a corresponding method and a corresponding computer program are discussed.

The use of the term "text" in the present description is understood as encompassing all characters (e.g. alphanumeric characters or the like), and strings thereof, in any written language and any symbols used in written text.

The term "non-text" in the present description is understood as encompassing freeform handwritten or hand-drawn content (e.g. shapes, drawings, etc.) and image data, as well as characters, and string thereof, or symbols which are used in non-text contexts. Non-text content defines graphic or geometric formations in linear or non-linear configurations, including containers, drawings, common shapes (e.g. arrows, blocks, etc.) or the like. In diagrams for instance, text content may be contained in a shape (a rectangle, ellipse, oval shape . . . ) called containers.

Furthermore, the examples shown in these drawings are in a left-to-right written language context, and therefore any reference to positions can be adapted for written languages having different directional formats.

The various technologies described herein generally relate to capture, processing and management of hand-drawn or handwritten content on portable and non-portable computing devices. The systems and methods described herein may utilize recognition of user's natural writing and drawing styles input to a computing device via an input surface, such as a touch sensitive screen (as discussed later).

Whilst the various embodiments are described with respect to recognition of digital ink handwriting input using so-called online recognition techniques, it is understood that application is possible to other forms of input for recognition, such as offline recognition involving a remote device or server to perform recognition.

The terms "hand-drawing" and "handwriting" are used interchangeably herein to define the creating of digital contents by users through use of their hands (or fingers) or an input device (hand-held stylus or digital pen, mouse . . . ) on or with an input surface. The term "hand" or the like is used herein to provide concise description of the input techniques, however the use of other parts of a user's body for similar input is included in this definition, such as foot, mouth and eye.

As described in more details below, an aspect of the present invention involves using a computing device to display graphical objects (input elements) in various sections of a display area, locate an initiation point in the display area from which starts a user selection gesture which is performed on the computing device to define a selection area, and select each graphical object contained (partially or totally) in the selection area defined by the user selection gesture. More particularly, this selection area is formed by a selection path defined by the user selection gesture. Further aspects of the present invention will be described hereafter.

Figure 2:
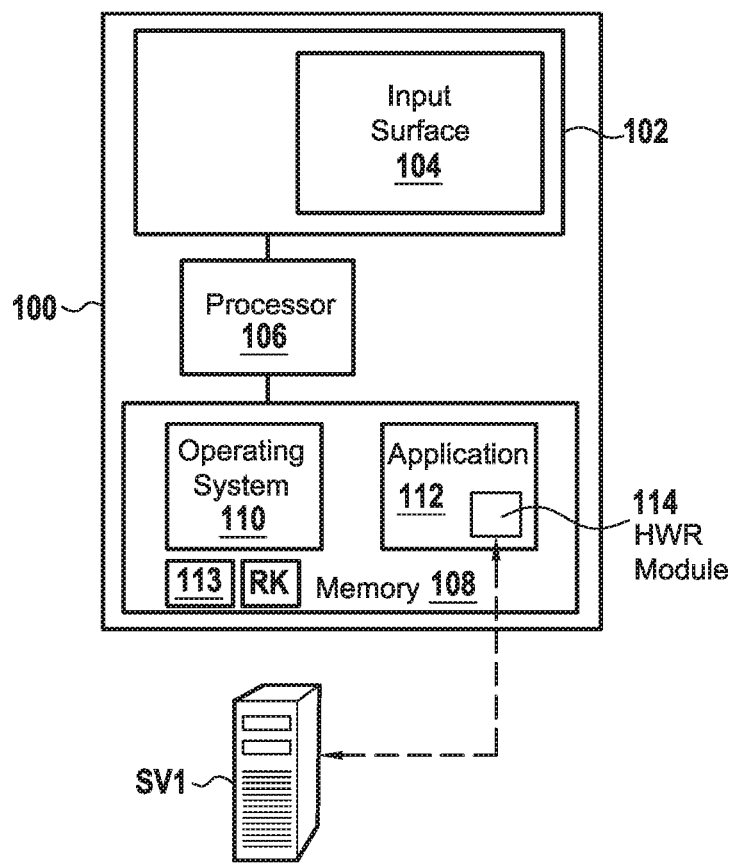
FIG. 2 is a block diagram representing schematically a computing device according to a particular embodiment of the invention.

FIG. 2 shows a block diagram of a computing device 100 according to a particular embodiment of the present invention. The computing device (or digital device) 100 may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing elements, some form of memory and input and output (I/O) devices. The components communicate with each other through inputs and outputs, such as connectors, lines, buses, links networks, or others known to the skilled person.

More specifically, the computing device 100 comprises at least one display device (or display) 102 for outputting data from the computing device such as images, text and video. The display device 102 may be a screen or the like of any appropriate technology (LCD, plasma . . . ). As described further below, the display device 102 is capable of displaying graphical objects (also called input elements) in digital ink, each graphical object being formed of at least one stroke of digital ink.

The computing device 100 also comprises an input surface 104 for hand-drawing (or handwriting) graphical objects including text and non-text objects, as described further below. The input surface 104 may be co-located with the display device 102 or remotely connected thereto. In a particular example, the display device 102 and the input surface 104 are parts of a same touchscreen. The input surface 104 may employ technology such as resistive, surface acoustic wave, capacitive, infrared grid, infrared acrylic projection, optical imaging, dispersive signal technology, acoustic pulse recognition, or any other appropriate technology as known to the skilled person to receive user input in the form of a touch- or proximity-sensitive surface. The input surface 104 may be a non-touch sensitive surface which is monitored by a position detection system.

As depicted in FIG. 2, the computing device 100 further comprises a processor 106 and a memory 108. The computing device 100 may also comprise one or more volatile storing elements (RAM) as part of the memory 108 or separate thereof.

The processor 106 is a hardware device for executing software, particularly software stored in the memory 108. The processor 108 can be any custom made or commercially available general purpose processor, a central processing unit (CPU), a semiconductor based microprocessor (in the form of microchip or chipset), a microcontroller, a digital signal processor (DSP), an application specific integrated circuit (ASIC), field programmable gate array (FPGA) or other programmable logic device, or any combination thereof, and more generally any appropriate processor component designed for executing software instructions as known to the skilled person.

The memory 108 constitutes (or comprises) a non-transitory (or non-volatile) computer readable medium (or recording medium) in accordance with a particular embodiment of the disclosure. The memory 108 may include any combination of non-volatile storing elements (e.g. ROM, EPROM, flash PROM, EEPROM, hard drive, magnetic or optical tape, memory registers, CD-ROM, WORM, DVD, or the like).

The memory 108 may be remote from the computing device 100, such as at a server or cloud-based system, which is remotely accessible by the computing device 100. The non-volatile memory 108 is coupled to the processor 106, so that the processor 106 is capable of reading information from and writing information to the memory 108. As an alternative, the memory 108 is integral to the computing device 100.

The memory 108 includes an operating system (OS) 110 and a handwriting application (or computer program) 112. The operating system 110 controls the execution of the application 112. The application 112 constitutes (or comprises) a computer program (or computer-readable program code) according to a particular embodiment of the invention, this computer program having instructions to implement a method according to a particular embodiment of the invention.

The application 112 may include instructions for detecting and managing ink graphical objects hand-drawn by a user using the input surface 104 of the computing device 100. These hand-drawn ink graphical objects, which may be text or non-text, are formed by one or plural strokes of digital ink.

In a particular embodiment, the application 112 may comprise a handwriting recognition (HWR) module (or system) 114 for recognizing handwritten input to the computing device 100, including handwritten text and non-text. The HWR 114 may be a source program, an executable program (object code), script, application, or any other component having a set of instructions to be performed. In the present example depicted in FIG. 2, the application 112 and the HWR module 114 are combined in a single application (the HWR module 114 is part of the application 112). Alternatively, the HWR module 114 may be a module, method or system for communicating with a handwriting recognition system remote from the computing device 100, such as a server (or cloud-based system) SV1 as depicted in FIG. 2 which is remotely accessible by the computing device 100 through an appropriate communication link. The application 112 and the HWR module 114 may also be separate components stored in the memory 108 (or in different memories) of the computing device 100, whereby the application 112 and the HWR module 114 operate together accessing information processed and stored in the memory 108.

As shown later in the figures, strokes entered on or via the input surface 104 are processed by the processor 106 as digital ink. Digital ink is formed by rendering handwritten input in digital image format, in this case on the display device 102.

A user may enter a stroke with a hand or finger, or with some input instrument such as a digital pen or stylus suitable for use with the input surface 104. The user may also enter a stroke by making a gesture above the input surface 104 if means configured to sense motions in the vicinity of the input surface 104 is being used, or with a peripheral device of the computing device 100, such as a mouse or a joystick or the like.

Each ink graphical object (e.g. letters, symbols, words, shape) is formed by one or a plurality of such strokes. A stroke is characterized by at least a stroke initiation location (corresponding to a "pen down" event), a stroke terminal location (corresponding to a "pen up" event), and the path connecting the stroke initiation and the stroke terminal locations. Because different users may naturally write or hand-draw a same object (e.g. letter, shape, symbol . . . ) with slight variations, the HWR module 114 accommodates a variety of ways in which each object may be entered whilst being still recognized as the correct or intended object.

Figure 3:
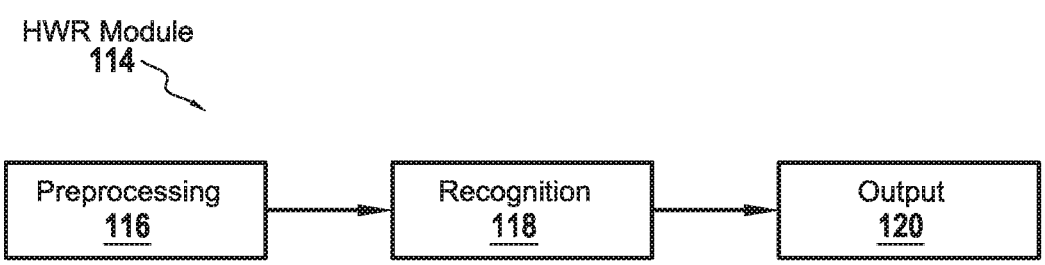
FIGS. 3-4 depict schematically components, and corresponding steps, of the computing device of FIG. 2, according to a particular embodiment of the invention.

FIG. 3 is a schematic diagram of an example of a recognition process performed by the HRW module 114, in either its local (i.e., loaded on the computing device 100) or remote (i.e., remotely accessible by the computing device 100) forms. Other implementations are however possible.

This recognition process includes stages (or steps) such as preprocessing 116, recognition 118 and output 120.

The preprocessing stage 116 processes the digital ink to achieve greater accuracy and reducing processing time during the recognition stage 118. This preprocessing may include normalizing of the path connecting the stroke initiation and stroke termination locations by applying size normalization and/or methods such as B-spline approximation to smooth the input.

The preprocessed strokes are then passed to the recognition stage 118 which processes the strokes to recognize the object formed thereby. The recognized objects are then output 120 to the memory 108 and displayed by the display device 102 as digital ink or typeset ink versions of the handwritten input elements (either text or non-text).

Figure 4:
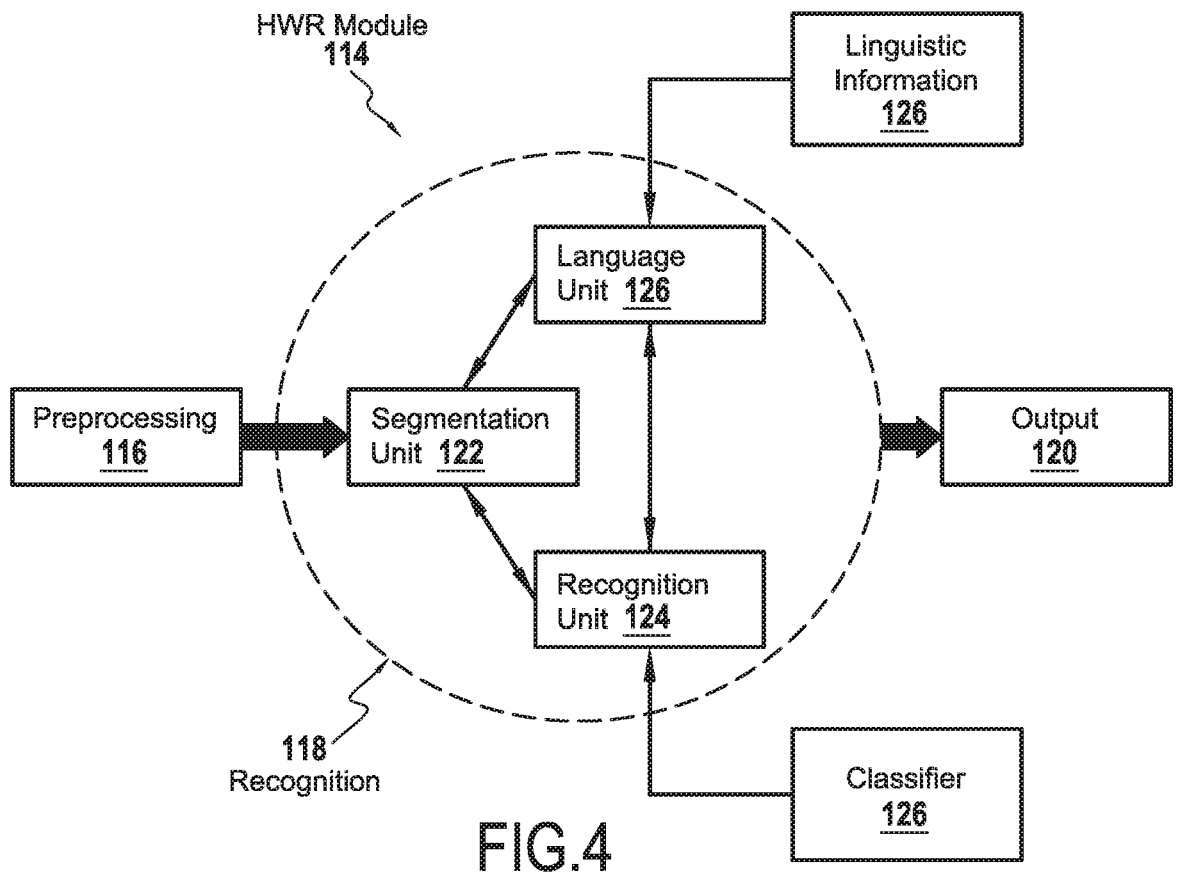

As depicted in FIG. 4 in accordance with a particular embodiment, the recognition 118 may include different processing units and corresponding steps. In particular, recognition 118 may be performed by a segmentation unit 122, a recognition unit 124 and a language unit 126 of the HWR module 114. Some aspects of these units are described herebelow to facilitate understanding of the present invention. However, no further detail is provided to avoid unnecessarily obscuring the present disclosure. An example of implementing handwriting recognition can for instance be found in U.S. Patent Application Publication No. 2017/0109578 A1.

The segmentation unit 118 may define the different ways to segment the input strokes into individual element hypotheses, e.g. alphanumeric characters, mathematical operators, text characters, individual shapes, sub-expression, in order to form expressions, e.g. words, mathematical equations, or groups of shapes. For example, the segmentation unit 118 may form the element hypotheses by grouping consecutive strokes of the original input to obtain a segmentation graph where each node corresponds to at least one element hypothesis and where adjacency constraints between elements are handled by the node connections.

The recognition unit 124 performs classification of the features extracted by a classifier 128 and outputs a list of element candidates with probabilities or recognition scores for each node of the segmentation graph. Many types of classifiers known to the skilled person can be used to address the recognition task. The classifier may classify each input element as text or non-text.

The language unit 126 generates linguistic meaning for the different paths in the segmentation graph using language models (e.g., grammar or semantics). The language unit 126 checks the candidates suggested by the units 122 and 124 based on linguistic information 130. The linguistic information 130 can include a lexicon(s), such as text-based lexicons (regular expressions, etc.) and/or shape-based lexicons. The language unit 130 aims at finding the best recognition path. In addition to the lexicon constraint, the language unit 126 may use statistical information modelling for how frequent a given sequence of elements appears in the specified language or is used by a specific user to evaluate the likelihood of the interpretation of a given path of the segmentation graph.

The handwriting application 112 allows generating handwritten or hand-drawn content (e.g., diagrams, charts, shapes, drawings, or any kind of text and/or non-text) in digital ink form and have this content faithfully recognized using the HWR module 114.

In the present embodiment, the handwriting application 112 implemented by the computing device 100 comprises a HWR module 114 for recognizing handwritten input to the computing device 100, including handwritten text and non-text. It should however be considered that other implementations without such a HWR module 114 is also possible. More generally, a computing device of the present invention is suitable to obtain, receive or determine in any appropriate manner graphical objects (containing text and/or non-text) which are processed in accordance with the method of the invention.

As will be described in more detailed below, the display device 102 is suitable to display in a display area a plurality of graphical objects in digital ink. In particular, this display area may comprise: a structured text section containing at least one text object arranged according to a guideline pattern, and at least one block section, distinct from the structured text section, containing at least one text or non-text object.

As also shown in FIG. 3, the memory 108 may also include a data structure 113 comprising information relative to each graphical object OB which are selected using the method of the present invention, as described further below. Further, information relative to the ranks RK of each graphical object OK present in the display area 200 may also be stored in the memory 18. The nature and use of the data structure 113 and ranks RK may be adapted by the skilled person to each specific implementation. Particular embodiments including the data structure 113 and the ranks are described below, although other embodiments are possible.

Figure 5:
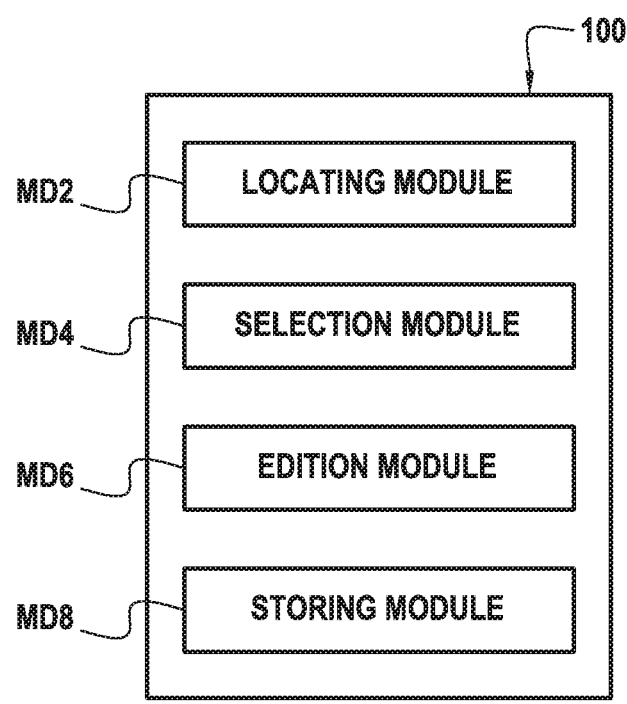
FIG. 5 is a block diagram representing schematically modules implemented by the computing device of FIG. 2, according to a particular embodiment of the invention.

In a particular embodiment illustrated in FIG. 5, when running the application 112 stored in the memory 108, the processor 106 implements a number of processing modules, that is: a locating module MD2, a selection module MD4, and possibly an edition module MD6 and/or a storing module MD8. Other embodiments notably without either the edition module MD6 and/or the storing module MD8 are however possible.

The application 112 comprises instructions configuring the processor to implement these modules in order to perform steps of a method of the invention, as described later in particular embodiments.

More specifically, the locating module MD2 may be configured to locate an initiation point in a display area from which starts a user selection gesture (referred to later as GT1) performed with the input surface 104 to define a selection area.

Further, the selection module MD4 may be configured to determine, based on the user selection gesture, a selection path forming the selection area in the display area and to select each graphical object contained at least partially within the selection area.

In the present embodiment, the selection module MD4 is configured to operate according to either a first mode ME1 or a second mode ME2, as a function of the initiation point's location determined by the locating module MD2. In other terms, the modes ME1 and ME2 are two different selection modes selectively applicable by the selection module MD4 in response to the location of the initiation point as determined by the locating module MD2. The selection module MD4 may thus apply either the selection mode ME1 or the selection mode ME2 as a function of where the user selection gesture starts.

The nature and operating of the first and second modes ME1, ME2 will be described further below in particular embodiments.

Once selection is made, the edition module MD6 may be configured to edit collectively as a block each graphical object selected by the selection module MD4.

In a particular example, the storing module MD8 may be used to store information relative to the graphical objects displayed on the display device 102. In particular, the storing module MD8 may store a respective rank RK for each of the graphical objects present in a display area, the ranks RK of these graphical objects being ordered according to a particular rank order. The ranks RK of the graphical objects may be taken account by the selection module MD4 to determine which graphical objects should be included in a selection triggered by a user selection gesture.

The configuration and operation of the modules MD2-MD8 of the computing device 100 will be more apparent in the particular embodiments described hereinbelow with reference to the figures. It is to be understood that the modules MD2-MD8 as shown in FIG. 5 represent only an example embodiment of the present invention, other implementations being possible.

For each step of the method of the present invention, the computing device may comprise a corresponding module configured to perform said step.

A method implemented by the computing device 100 illustrated in FIGS. 2-5 is now described with reference to FIGS. 6-17, in accordance with a particular embodiment of the present invention. More specifically, the computing device 100 implements this method by executing the application 112 stored in the memory 108.

An example scenario is contemplated where hand-drawn (or handwritten) graphical objects OB are input to the computing device 100 and a user then wishes to select one or more of these graphical objects, for instance to perform some editing on each selected graphical object OB. It is assumed in this example that these graphical objects OB are hand-drawn by a user on the computing device 100 using the input surface 104. Alternatively, these hand-drawn graphical objects OB may be obtained, received or determined in any suitable manner by the computing device 100.

In a displaying step S2 (FIG. 6), the computing device 100 displays a plurality of graphical objects OB in digital ink, in a display area 200 of the display device 102. As shown in FIG. 7, the computing device 100 may display (S2) for instance:
- a structured text section (or structured text block) 202 containing at least one text object OB arranged according to guidelines pattern 204, and
- at least one block section BL, distinct from the structured text section 202, containing at least one text or non-text object OB.

The one or more block sections BL may be of various natures. They may comprise at least one of the following (or any combination thereof):
- a drawing block section containing at least one drawing object OB;
- a mathematic block section containing at least one mathematic object OB representative of a mathematic formulation; and
- a diagram block containing text and non-text objects OB.

A drawing object as mentioned above may be (or comprise) a photo or an image.

More specifically, as shown in FIG. 7, it is assumed in this example that the display device 102 displays (S2) in a display area 200:
- a structured text section 202 containing two text objects OB1 and OB2 arranged according to a guideline pattern 204; and
- 3 block sections BL1, BL2 and BL3 (referred to collectively as BL), distinct from the structured text section 202, which contain each one or more text and/or non-text objects OB.

Each of sections 202, BL1, BL2 and BL3 are distinct from each other.

Other examples may of course be contemplated. In particular, the number and nature of the block sections BL may vary, as understands the person skilled in the art.

As shown in FIG. 7, the structured text section contains two text objects OB1 and OB2 corresponding respectively to the handwritten words "hello" and "how" in this example. These text objects OB1, OB2 are arranged according to a guideline pattern 204. In other words, the text objects OB1, OB2 are displayed in the structured text section 202 in a structured format defined by the guideline pattern 204. The guideline pattern 204 comprises a plurality of guidelines (or base lines) along which the text objects OB1, OB2 are positioned. The guideline pattern 204 imposes constraints of position, orientation and size on the text input displayed in the structured text section 202. The guideline pattern 204 may also define a margin and/or a predetermined line length which imposes a maximum length of each text line in the structure format.

In the present example, all the guidelines of the guideline pattern 204 are parallel and separated by a constant interline distance from adjacent guidelines. It should be understood however that this structured format, which is based on the guideline pattern 204, constitutes a mere example of implementation. Other guideline patterns could be contemplated by a person skilled in the art.

As also shown in FIG. 7, the block section BL1 is a mathematic block section containing a mathematic object OB5 representative of a mathematic formulation (i.e. "5+2=7"). The block section BL2 is a diagram block section containing a diagram object OB8 comprising text content (i.e. characters) and non-text content (i.e. shapes forming containers and arrows). The block section BL3 is a drawing block section containing a drawing arranged in a free handwriting format, i.e. without any constraints of lines to follow or input size to comply with (e.g. on a blank area), by contrast with a structured format. In the present example, this drawing comprises two drawing objects OB10 and OB11.

As a general rule, the way the hand-drawn input displayed in the display area 200 is defined into graphical objects may be adapted by a person skilled in the art, depending on each use case. In this present example, each word in the structured text section 202 constitutes a distinct graphical object OB, although defining graphical objects at other levels is possible (e.g. object definition at a character level or text line level). Likewise, each mathematical character or symbol present in the mathematic block section BL1 may be defined as a distinct graphical object OB. The same applies to the block sections BL2 and BL3.

In the present example shown in FIG. 7, the structured text section 202 forms a background of the display area 200 with guidelines for guiding text input. The block sections BL are displayed over (i.e. on top of and along with) this background. Other implementations are however possible.

Figure 8:
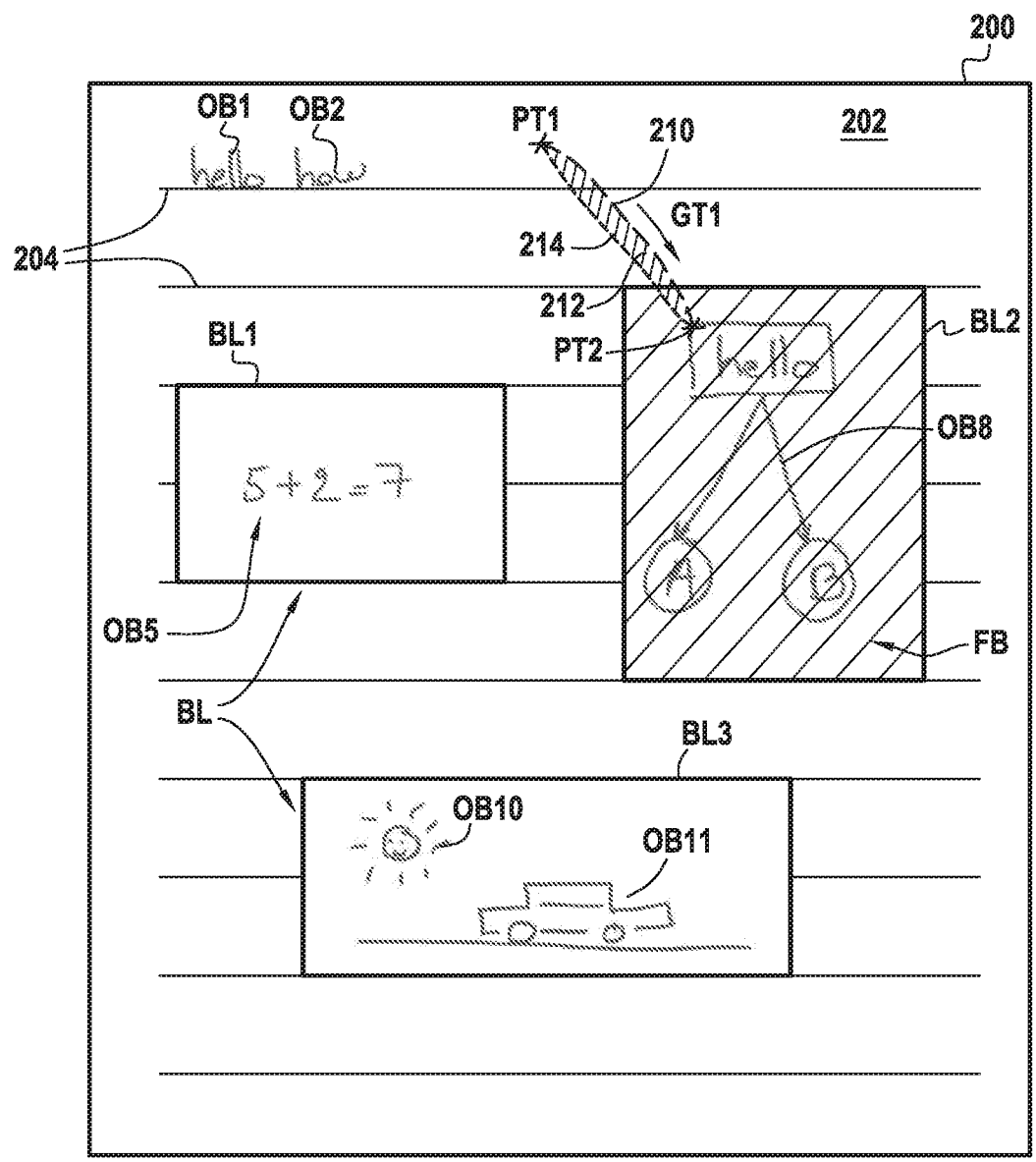

As shown in FIG. 8, in a locating step S4 (FIG. 6), the computing device 100 locates an initiation point PT1 in the display area 202 from which starts a user selection gesture GT1 performed with the input surface 104 to define a selection area (also called lasso enclosure) 212. In other words, the computing device 100 detects initiation of a user selection gesture GT1 performed by a user with the input surface 104 to define a selection area 212, and locates the initiate point (or start point) PT1 from which originates this user selection gesture GT1.

In the present example, the user selection gesture GT1 is an interaction of a user's body part (or any input tool) with the input surface 104 which causes generation of a stroke of digital ink on the display device along the selection path. Display of this digital ink provides visual feedback to assist the user while he/she is drawing a selection path in the display area.

An initiation of a user selection gesture GT1 may thus be detected upon detecting a pen down event, i.e. a contact of a user's body (or any appropriate input tool) with the input surface 104.

More specifically, the computing device 100 determines in S4 in which section of the display area 200 the initiation point PT1 is located among the structured text section 202 and the 3 block sections BL1, BL2 and BL3 (FIG. 8). The way the forthcoming user selection will be performed is function of the location of the initiation point PT1 within the display area 200. As discussed further below, selection of one or more graphical objects OB may be performed in accordance with either a first mode ME1 or a second mode ME2, depending on the location of the initiation point PT1 of the user selection gesture GT1.

In a determining step S6 (FIG. 6), the computing device 100 thus determines, based on the location of the initiation point PT1 obtained in S4, which one of modes ME1 and ME2 is applied to perform a selection of at least one graphical objects OB in the display area 200.

If the initiation point is located (S4) in the structured text section 202, the computing device 100 selects (S6) the first mode ME1. If however the initiation point is located (S4) in one of the block sections BL, then the computing device 100 selects (S6) the second mode ME1. These two modes ME1 and ME2 are described in more details below in a particular embodiment.

As shown in FIG. 8, the user selection gesture GT1 performed with the input surface 104 starts from the initiation point PT1 to select at least one graphical object OB in the display area 200. In practice, the user moves a point of contact (or point of interaction) on the input surface 104 starting from the initiation point PT1 to perform the user selection gesture GT1.

In both of these modes ME1 and ME2, the computing device 100 determines (S7, FIG. 6) a selection path 210 based on the user selection gesture GT1 and in accordance with the mode ME1 and ME2 selected in S6. This selection path 210 corresponds to the user selection gesture GT1 and forms a selection area 212 in the display area 200. Determination of this selection path 210 can be made dynamically while the user selection gesture GT1 is performed by the user with the input surface 104.

To this end, the computing device 100 determines in S7 the position over time of an end point PT2 of the selection path 210 defined by the user selection gesture GT1. While the user selection gesture GT1 is in progress, the end point PT2 moves within the display area 200. The computing device 100 can thus determine dynamically the selection path 210 which corresponds to the path defined by the end point PT2's movement, starting from the initiation point PT1.

Figure 6:
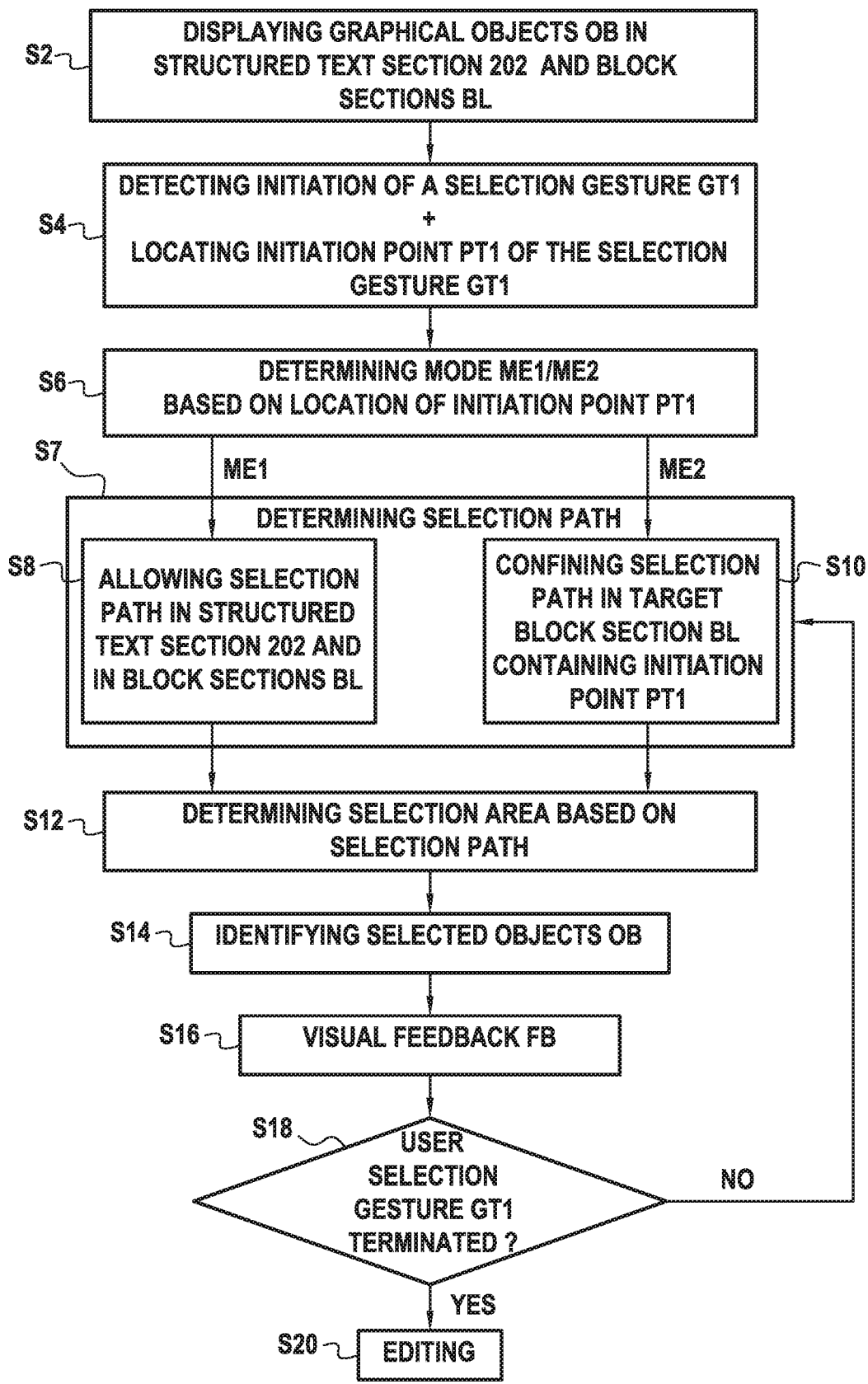
FIG. 6 is of flow diagram representing schematically steps of a method according to a particular embodiment of the present invention.
Figure 7:
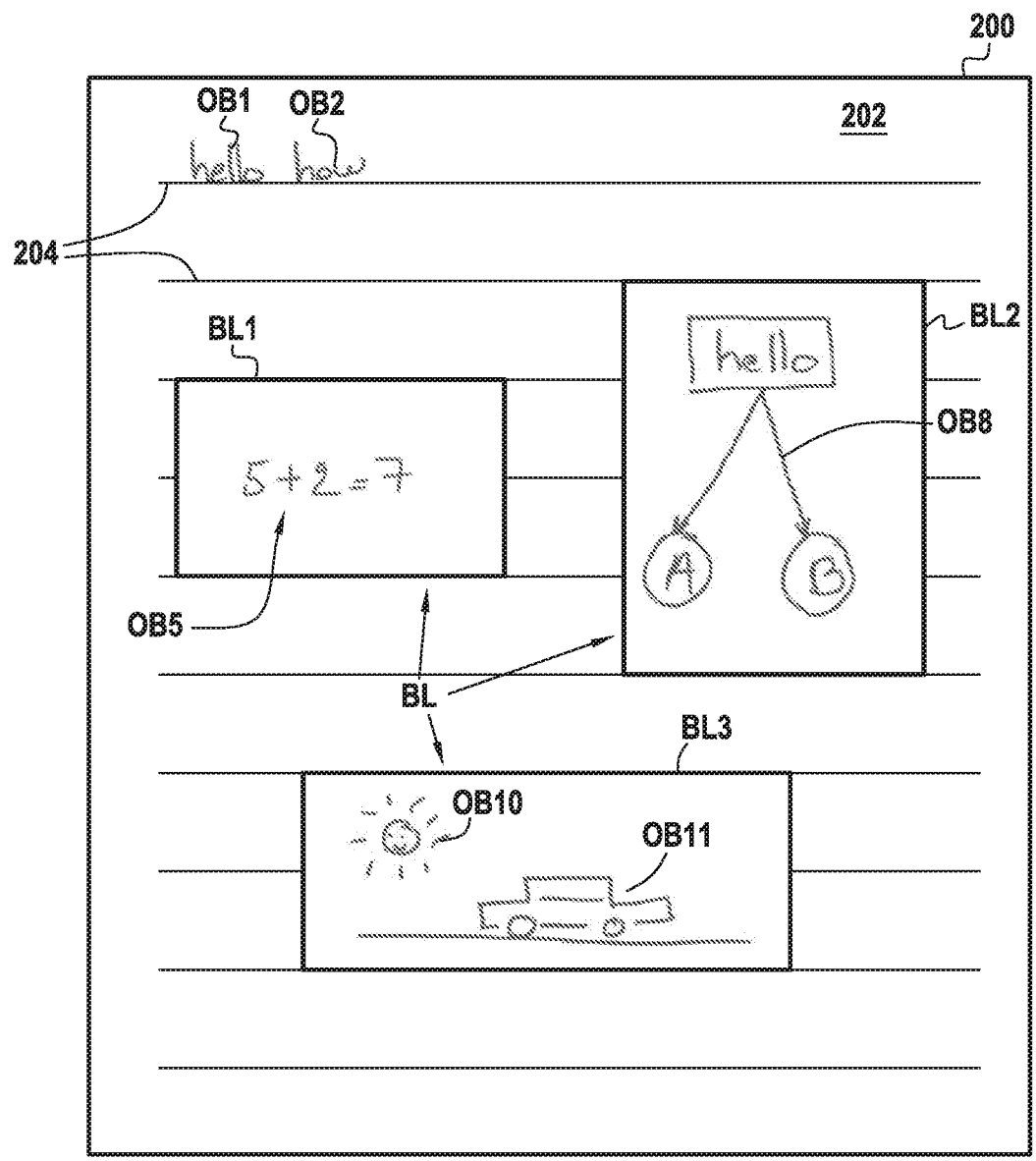
FIGS. 7-14 are schematic representations of the operation of the computing device of FIG. 2, in accordance with particular embodiments of the present invention.

The selection step S7 in FIG. 6 is referred to more specifically as steps S8 and S9 when the computing device 100 operates respectively in the first mode ME1 and second mode ME2.

If the first mode ME1 is applied (in case the initiation point is located within the structured text section 202), the computing device 100 allows (S8, FIG. 6) the selection path 210 to be drawn in the display area 200 to select any graphical object OB of the structured text section 202 and of the block sections BL. On the other hand, if the second mode ME2 is applied because the initiation point is located within a target block section among the block sections BL, the computing device 100 confines (S10, FIG. 6) the selection path 210 within the target block section to prevent selection of any graphical object OB outside said target block section.

In other words, in the first mode MEL the selection path 210 can be freely drawn (S8) by the user across any of the structured text section 202 and the block sections BL so as to select any of the graphical objects OB1, OB2, OB5, OB8, OB10 and OB11. No constraint is imposed by the computing device 100 on the selection path while the user selection gesture GT1 is being performed with the input surface 104 in the display area 200.

By contrast, in the second mode ME2, the selection path 210 drawn by the user is limited or confined (S10) by the computing device 100 into the one block section—so-called target block section—which contains the initiation point PT1 located in step S4. Even if the user selection gesture GT1 moves outside the target block section BL, the computing device 100 restraints the selection path 210 within the target block section such that no graphical object OB outside said target block section can be selected. In the second mode ME2, only selection of one or more graphical objects OB present within the target block section BL can thus be made.

In the example shown in FIGS. 8-14, it is assumed that the initiation point PT1 of the user selection gesture GT1 is located in the structured text section 202. Accordingly, the computing device 100 selects the first mode ME1 (S6) to allow selection of one or more graphical objects OB.

As a result, the computing device 100 operates in accordance with the first mode MEL thereby allowing the selection path 210 to be drawn (S8) in the display area 200 to select any graphical object OB of the structured text section 200 and of the 3 block section BL. It means that if the user selection gesture GT1 is detected as moving within any one of the block section BL, the computing device 100 determines that the selection path 210 is drawn along a corresponding path within said block section BL. As already indicated, no boundary or localisation restraint is imposed on the selection path 210 within the display area 202 in the first mode ME1.

In the present example, when the computing device 100 operates according to the first mode MEL the path of the point of contact applied by the user over time on the input surface 104 is identical to (or matches) the selection path 210.

In the example depicted in FIG. 8, the user selection gesture GT1 moves from the initiation point PT1 located in the structured text section 202 into the block section BL2. In response thereto, the computing device 100 defines the end point PT2 as moving in correspondence therewith into the block section BL2, in accordance with the first mode ME1.

As shown in FIG. 8, in a determining step S12 (FIG. 6), the computing device 100 determines a selection area 212 formed by the selection path determined in S6. In the present example, this determination S12 is performed dynamically while the user selection gesture GT1 is being performed. Other implementations are possible however where the selection area 212 is only determined once the user selection gesture GT1 is completed.

More specifically, in the determining step S12, the computing device 100 (namely the selection module MD4) determines a connection line 214 joining the initiation point PT1 with the end point PT2 of the selection path 210, thereby forming the selection area 212. In the following examples, the connection line 214 is a straight line, although other implementations are possible. The computing device 100 thus determines dynamically the selection area 212 defined by the selection path 210 and the connection line 214, while the user selection gesture GT1 is still in progress.

Figure 15:
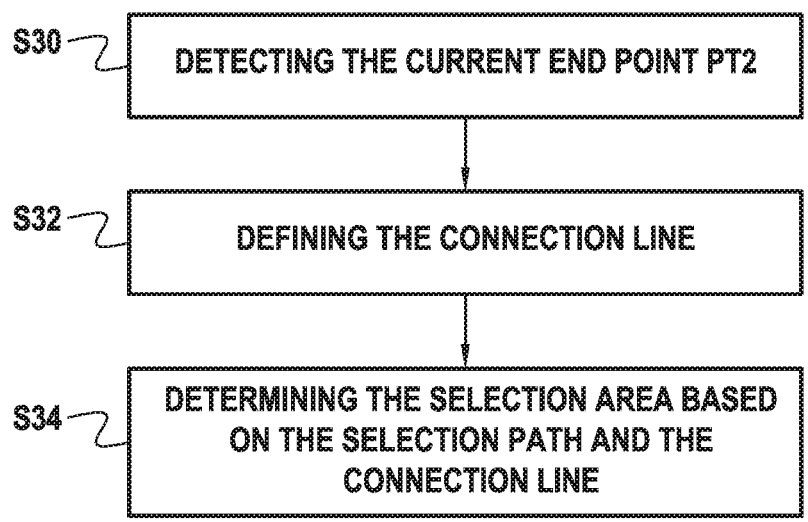
FIG. 15 is of flow diagram representing schematically steps of a method according to a particular embodiment of the present invention.

In a particular example depicted in FIG. 15, the computing device 100 detects (S30) a current end point PT2 while the selection path 210 is still being drawn by the user selection gesture GT1, defines (S32) dynamically the connection line 214 joining the initiation point PT1 (determined in S4) and the current end point PT2, and determines (S34) the selection area 212 formed by the selection path 210 and the connection line 214.

Further, in a selecting step (S14, FIG. 6), the computing device 100 selects each graphical object OB contained at least partially within the selection area 212 determined in S12. The computing device 100 can thus identify dynamically which graphical objects OB are positioned at least partially within the selection area 212 while the user selection gesture GT1 is being performed. The user selection gesture GT1 thus results in selecting each graphical object OB encircled at least partially in the selection area 212.

In the example depicted in FIG. 8, the computing device 100 detects (S14) that a portion of the graphical object OB8 is positioned within the selection area 212 and thus identifies the graphical object OB8 as part of a selection in response to the user selection gesture GT1.

The computing device 100 may also generate and store (S14) a data structure 113 comprising information relative to each graphical object OB which is being currently selected by the user selection gesture GT1 (i.e. which is currently part of the selection). The data structure 113 may for instance list a respective identifier of each graphical object OB which is currently part of the selection. The data structure can be dynamically updated while the user selection gesture GT1 progresses over time (thereby changing the selection area 214). The identifier of each newly selected graphical object OB can for instance be added over time within the data structure 113 to update the selection being made.

In a particular example, a graphical object OB currently part of the selection may get unselected (i.e. removed from the current selection) if the selection area 212 dynamically determined (S12) based on the selection path 210 no longer contains said graphical object OB. In this case, the identifier of each graphical object OB which becomes unselected is removed from the data structure 113.

In a particular example, each graphical object OB which is at least partially contained (whatever the relative proportion thereof) in the current selection area 212 is included as part of the selection.

In a particular example, selection is performed in S14 such that each graphical object OB which presents a relative proportion within the selection area 212 exceeding a predetermined threshold is selected. For instance, each graphical objects having at least 20%, or 50%, positioned inside the current selection area 212 is included as part of the selection. In this case, if only a relative small portion of a graphical object OB, below the predetermined threshold, is positioned within the selection area 212, then the graphical object is not included in the selection.

As shown in a particular example in FIG. 8, the display device 102 may also generate (S16, FIG. 6) a visual feedback FB for each graphical object OB being currently selected by the user selection gesture GT1 while the selection path 210 is being drawn. This visual feedback, which can be of various forms, may identify or highlight the current selection while the user selection gesture GT1 is still being performed (e.g. prior to detection of a pen up event). For instance, each selected graphical object OB changes appearance (e.g. by triggering a color change and/or displaying a distinct boundary box containing each selected object). Other implementations without a visual feedback FB are also possible. In a particular embodiment, the visual feedback FB is not triggered while the user selection gesture GT1 is still in progressed but instead is only triggered once it is detected (S18) that the user selection gesture GT1 is terminated.

As long as the user selection gesture GT1 is in progress, the graphical object selection may vary over time. The computing device 100 can thus reiterate steps S7-S14 over time in accordance with the mode selected in step S6 (i.e. the first mode ME1 in this example) as long as no pen up event is detected (S18). In the present example, detection of a pen up event means that the user terminates his/her user selection gesture GT1 with the input surface 104. Other ways of detecting termination of a user selection gesture GT1 are however possible. For instance, termination of the user selection gesture GT1 may be detected upon detecting that the selection path 210 intersects with itself (i.e. the end point PT2 crosses the selection path 210).

By reiterating steps S7-S14 over time, the computing device 100 dynamically updates (S12) the selection area 212 based on the current selection path 210, thereby also updating (S14) the graphical object selection based on the selection area 212. To this end, the data structure 113 may be updated to keep an up-to-date selection of the one or more graphical objects OB being currently selected by the user selection gesture GT1.

The computing device 100 may also adapt (S18) the visual feedback FB while the user selection gesture GT1 is being performed.

As shown in FIGS. 9-13, the computing device 100 may proceed in the same manner while the user selection gesture GT1 is moving forward.

Figure 9:
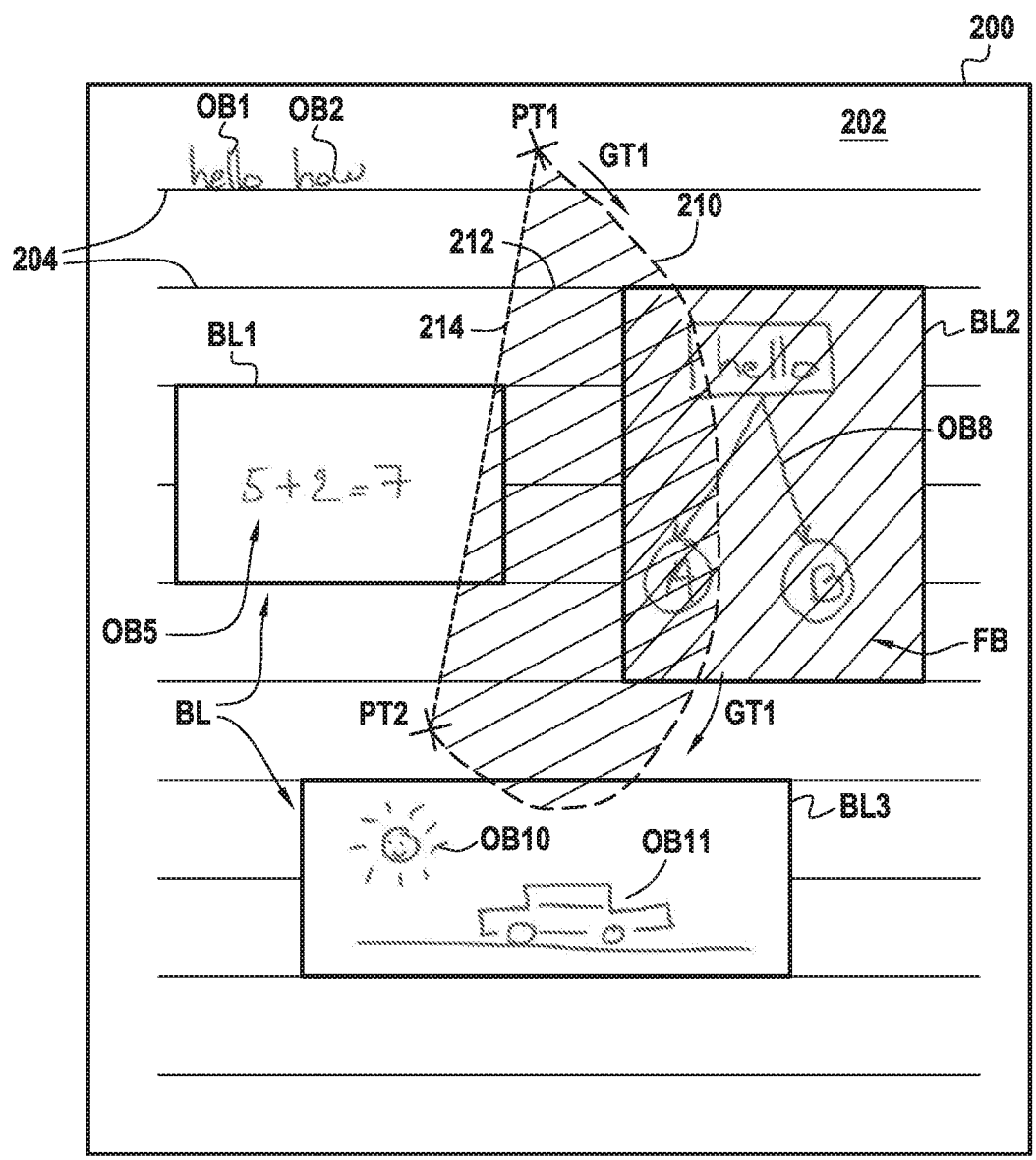

More specifically, as shown in FIG. 9, the computing device 100 may for instance detect that the user selection gesture GT1 moves on across the block section BL3. In accordance with the first mode ME1 the computing device 100 allows (S8) the selection path 210 to be drawn along a corresponding path within the block section BL3. The new selection area 212 is determined (S12) dynamically and the selection is updated (S14) in the same manner as described earlier.

It is assumed in the present case that none of graphical objects OB10 and OB11 is contained in the selection area 212 now formed by the current selection path 210. Accordingly, the computing device 100 keeps the selection unchanged (S14) which means that only graphical object OB8 is part of the current selection. The visual feedback FB thus also remains unchanged (S16).

Figure 10:
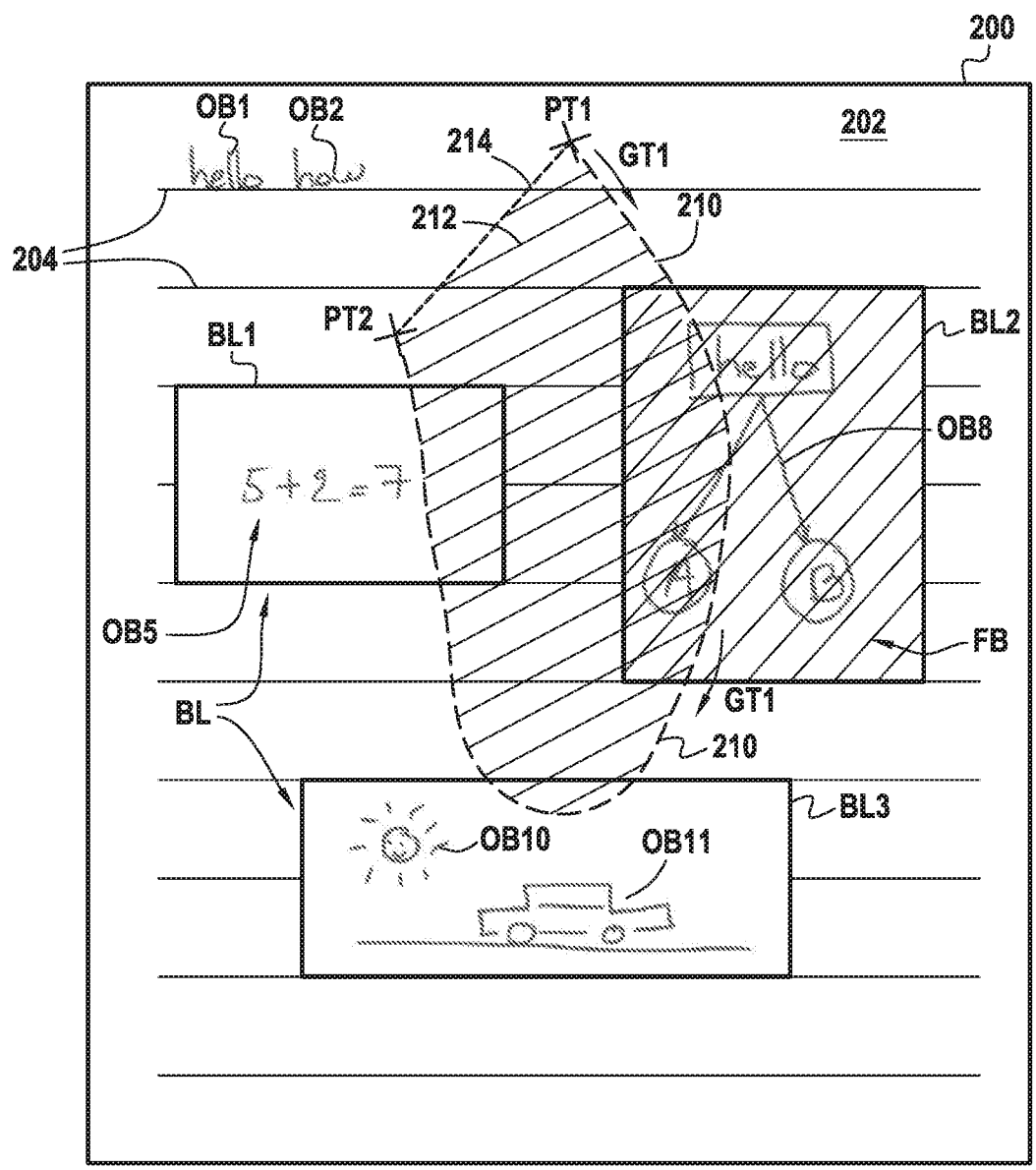

As shown in FIG. 10, the computing device 100 detects in this example that the user selection gesture GT1 moves on across the block section BL2. In accordance with the first mode ME1 the computing device 100 allows (S8) the selection path to be drawn along a corresponding path within the block section BL2. The new selection area 212 is determined (S12) dynamically and the selection is updated (S14) in the same manner as described earlier.

It is assumed in the present case that the graphical object OB5 is not contained in the selection area 212 now formed by the current selection path 210. Accordingly, the computing device 100 keeps the selection unchanged (S14) which means that only graphical object OB8 is part of the current selection. The visual feedback FB thus also remains unchanged (S16).

Figure 11:
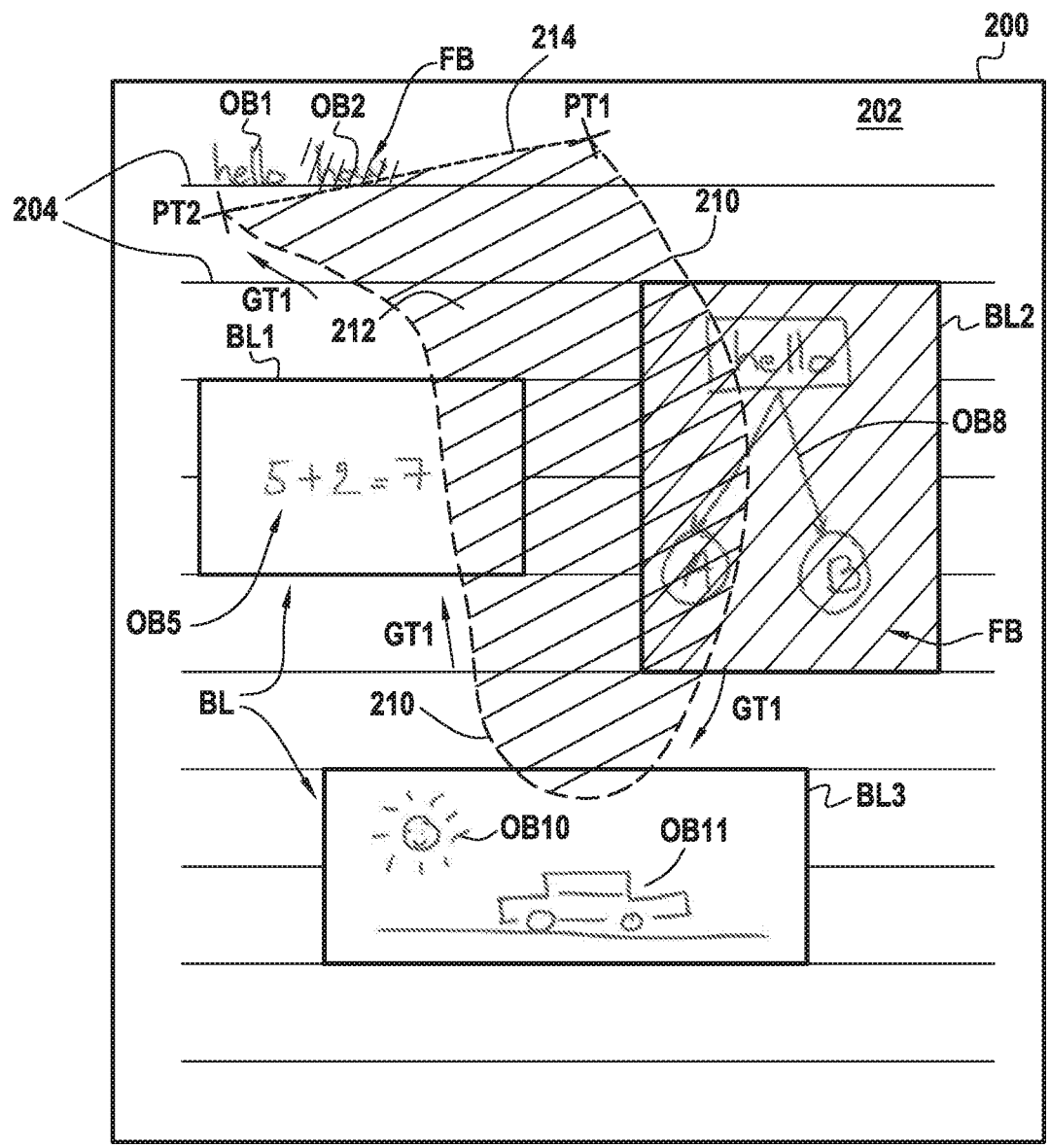

As shown in the example of FIG. 11, it is now assumed that the user selection gesture GT1 moves forward within the structured text section 202. In accordance with the first mode ME1 the computing device 100 allows (S8) the selection path to be drawn along a corresponding path within the structured text section 202. The new selection area 212 is determined (S12) dynamically and the selection is updated (S14) in the same manner as described earlier.

It is assumed in the present case that the end point PT2 of the selection path 210 is positioned such that the connection line 214 now joining the initiation point PT1 and the end point PT2 intersects the graphical object OB2. As a result, the selection area 212 determined in step S12 contains partially the graphical object OB2, thus causing selection (S14) of the graphical object OB2 in addition to OB8. In other words, the graphical object OB2 is included as part of the current selection along with OB8. The data structure 113 representative of the current selection is updated accordingly to include an identifier of the graphical object OB2. The visual feedback FB is also adapted (S16) to highlight the graphical object OB2 as well as OB8.

Figure 12:
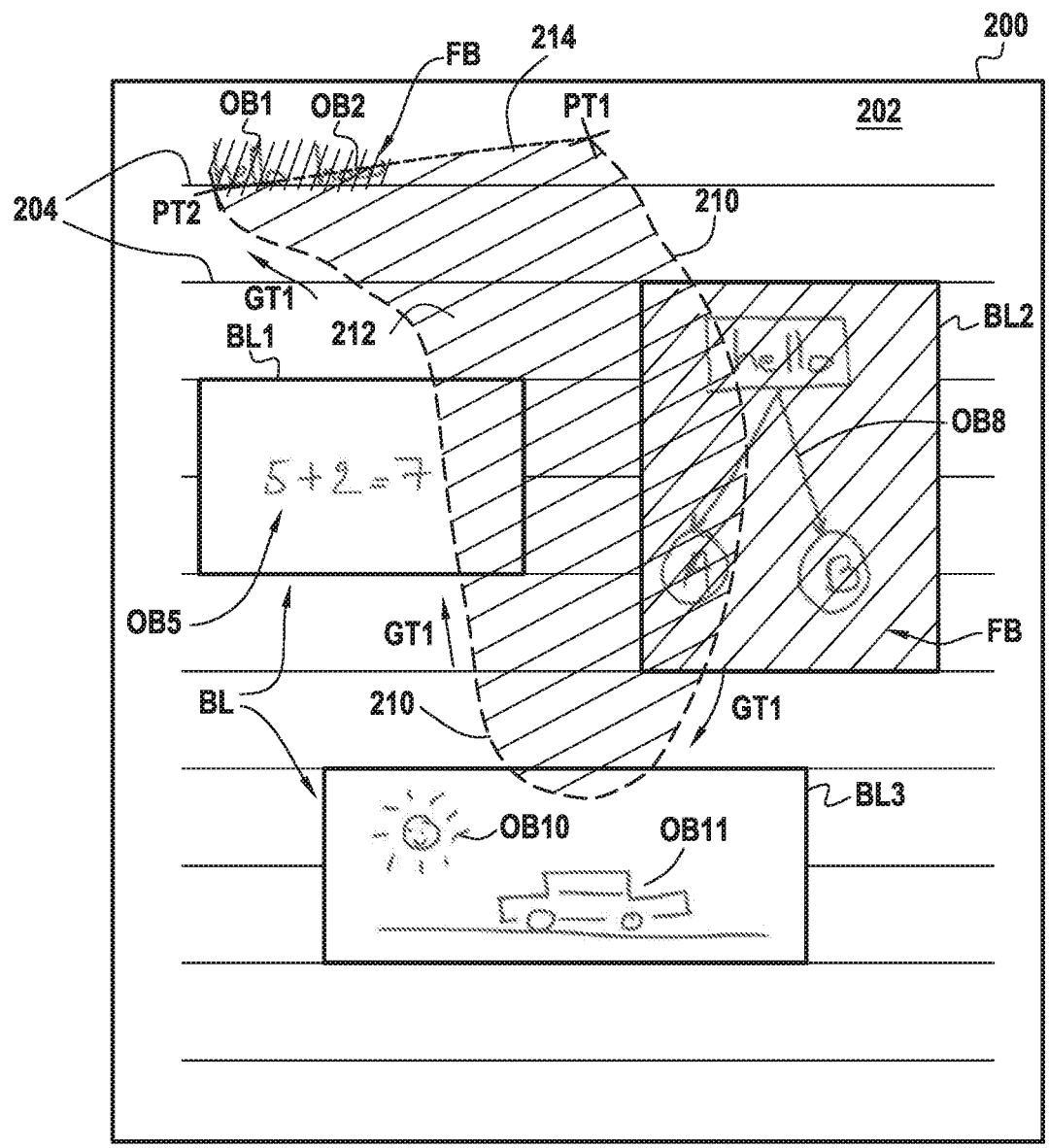

As shown in the example of FIG. 12, it is assumed that the user selection gesture GT1 moves even further within the structured text section 202. In accordance with the first mode ME1, the computing device 100 still allows (S8) the selection path to be drawn along a corresponding path within the structured text section 202. The new selection area 212 is determined (S12) dynamically and the selection is updated (S14) in the same manner as described earlier.

It is assumed in the present case that the end point PT2 of the selection path 210 is positioned such that the connection line 214 now joining the initiation point PT1 and the end point PT2 intersects the graphical object OB1. As a result, the selection area 212 determined in step S12 contains partially the graphical object OB1, thus causing also selection (S14) of graphical object OB1 in addition to OB2 and OB8. In other words, the graphical object OB1 is included as part of the current selection along with OB2 and OB8. The data structure 113 representative of the current selection is updated accordingly to include an identifier of the graphical object OB1. The visual feedback FB is also adapted (S16) to highlight the graphical object OB1 as well as OB2 and OB8.

Figure 13:
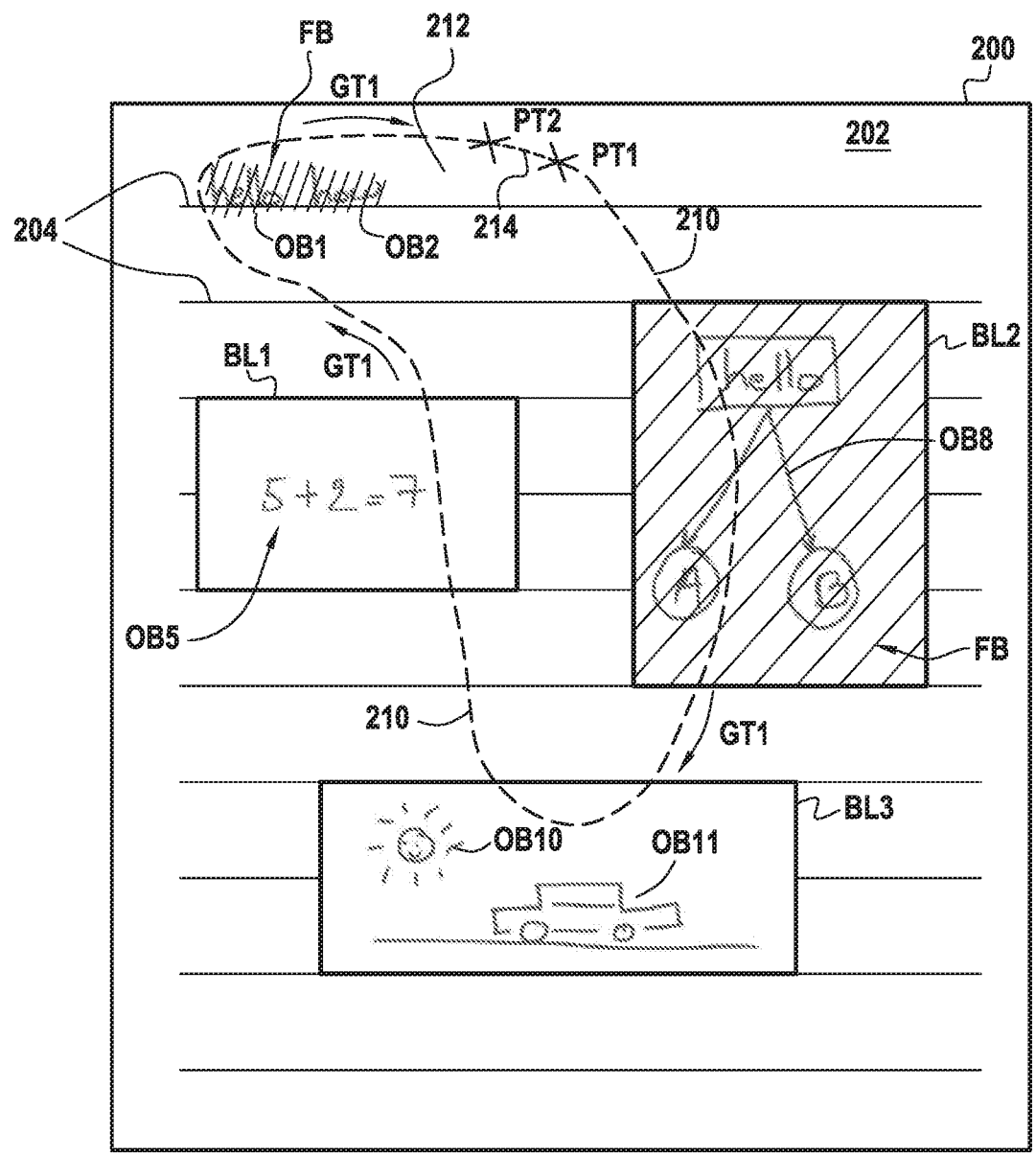

As shown in FIG. 13, it is assumed that the user selection gesture GT1 goes on in the structured text section 202 without impacting the current selection and is then terminated upon detecting (S18, FIG. 6) a pen up event (i.e. the user ends his/her interaction with the input surface 104). In the present example, when the user removes his/her finger or input tool from the surface input 104, the computing device 100 deduces that the selection process is completed (S18).

Once the user selection gesture GT1 is terminated, selection is thus made of each graphical object OB identified in step S14 as being part of the selection. The data structure 113 can be used to identify the final selection based on the respective identifier of each selected graphical object OB. Any appropriate operation of editing (e.g. copy/past, cut/past, resizing, moving, text reflow) or the like may thus be performed (S20) on the selected group of at least one graphical object OB. In particular, the computing device 100 may edit (S20) collectively as a single block each graphical object OB selected in response to the user selection gesture GT1.

Figure 14:
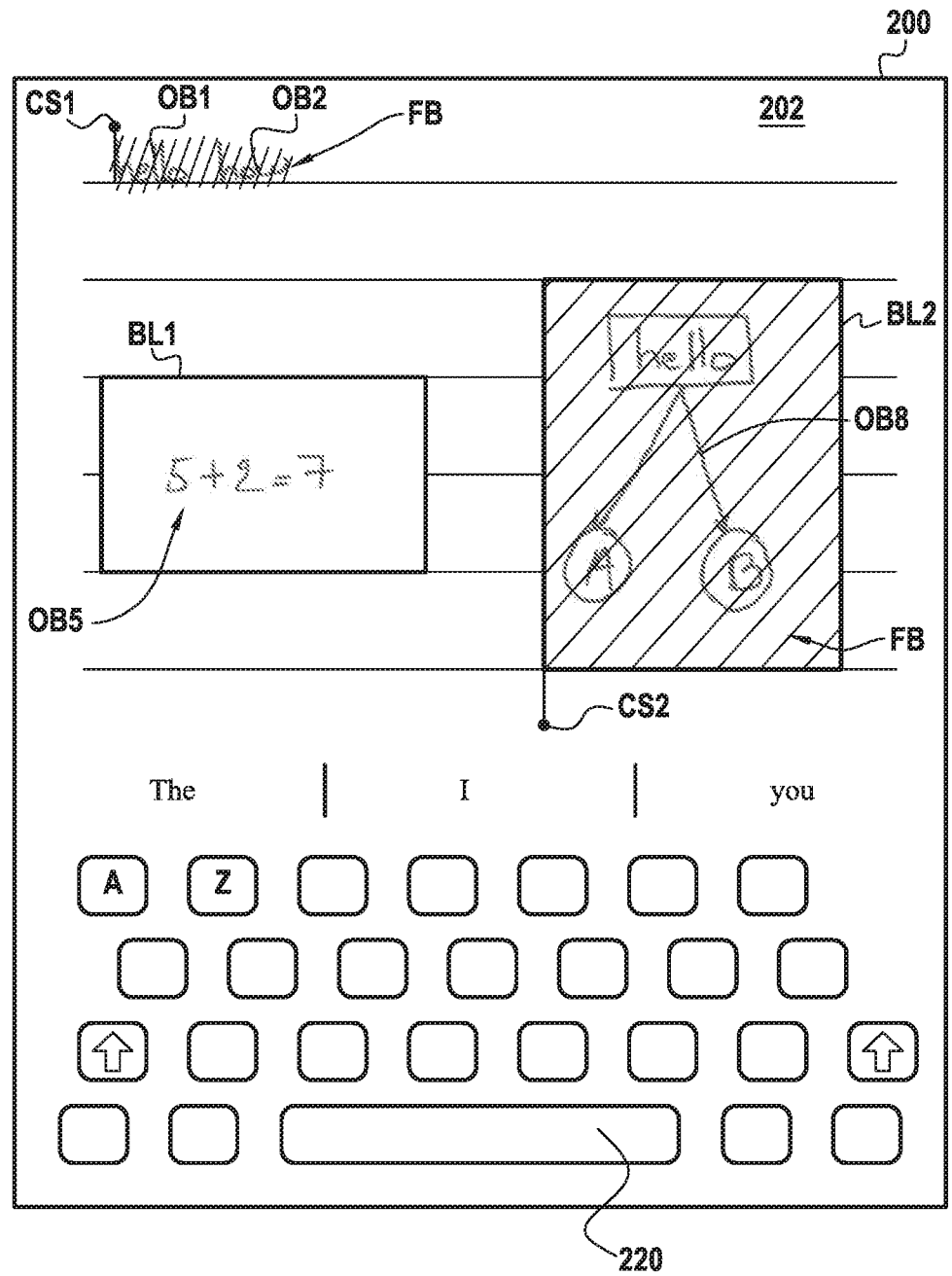

In a particular example shown in FIG. 14, once the user selection gesture GT1 is detected as terminated (S18), the computing device 100 may also display a start cursor CS1 and end cursor CS2 at the beginning and end of the global selection collectively formed by each selected graphical object OB. As indicated earlier, a rank RK of each graphical object OB may be defined according to a particular order and stored in the memory 108. The computing device 100 may thus determine a first and last graphical object OB among the selection based on the respective rank RK of each selected graphical object OB. At present, it is assumed that the graphical objects OB are ranked according to the following order: OB1, OB2, OB5, OB8, OB10 and OB11. A start cursor CS1 may thus be displayed adjacent to the first graphical object (i.e. OB1) of the selection and an end cursor CS2 may be displayed adjacent to the last graphical object (i.e. OB8) of the selection. Displaying the cursors CS1 and CS2 helps the user to identify the start and end of the global selection (e.g. prior to editing) and may also allow adapting if necessary the global selection (to add or remove graphical objects) by moving the start and/or end cursors CS1, CS2. To this end, the start and end cursors can be provided with handles that a user can select and drag within the display area 200 to change the global selection.

As shown in a particular example in FIG. 14, a soft keyboard may also be displayed once the end of the user selection gesture GT1 is detected (S18) to allow the user to perform editing on each graphical object OB selected in response to the user selection gesture GT1.

It should be noted that the computing device 100 may operate in the same manner according to the first mode ME1, irrespective of whether a text object OB is actually present in the structured text section 202. In a variant, no text object OB is displayed in the structure text section 202, when the steps S7-S14 are performed in the first mode ME1.

As described above, the selection module MD4 is configured to operate according to either a first mode ME1 or a second mode ME2, as a function of the initiation point's location determined in locating step S4 (FIG. 6) by the locating module MD2. A particular example was described above with reference to FIGS. 8-14 where the computing device 100 operates according to the first mode ME1, thereby allowing the selection path 210 to be drawn in the display area 200 to select any graphical object OB of the structured text section 202 and of the block sections BL. In the first mode ME1, any graphical object OB, positioned within the structured text section 202 and within the block sections BL, and which is at least partially contained in said selection area, can thus be selected by means of the user selection gesture GT1.

Another example is now described with reference to FIGS. 16-17, where the computing device 100 operates according to the second mode ME2, thereby confining the selection path 210 within a given block section BL, so-called target block section BL, where the user selection gesture GT1 starts. Selection of any graphical object OB outside said target block section is thus prevented.

Figure 16:
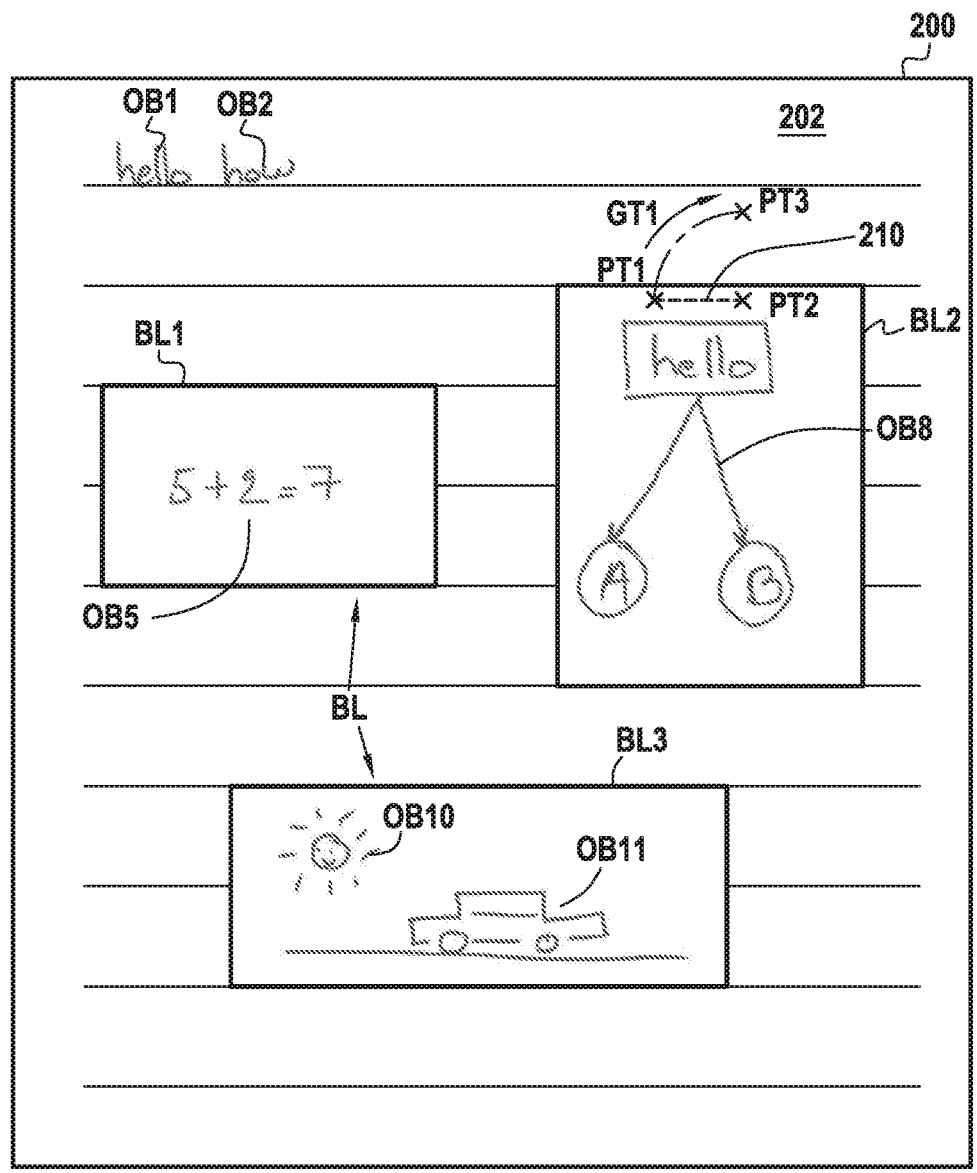
FIGS. 16-17 are schematic representations of the operation of the computing device of FIG. 2, in accordance with particular embodiments of the present invention.

More specifically, as shown in FIG. 16, the steps S2, S4 and S6 are performed as already described earlier with respect to FIG. 6. At present, it is assumed that the initiation point PT1, corresponding to the start of the user selection gesture GT1 performed by the user with the input surface 104, is located within a block section BL, i.e. block section BL2 in this example. This block section BL2 constitutes a target block section within the meaning of the present invention. Upon detecting that the initiation point PT1 is positioned within the target block section BL2, the computing device 100 selects (S6, FIG. 6) the second mode ME2 for performing a selection of at least one graphical object OB.

In a determining step S8 (FIG. 6), the computing device 100 then determines a selection path 210 based on the user selection gesture GT1 and in accordance with the mode ME2 selected in S6. This selection path 210 forms a selection area 212 in the display area 200, as already described. Determination of this selection path 210 can be made dynamically while the user selection gesture GT1 is performed by the user with the input surface 104.

As previously described with reference to the first mode ME1, the computing device 100 operating according to the second mode ME2 determines (S8) the position over time of an end point PT2 of the selection path 210 defined by the user selection gesture GT1. While the user selection gesture GT1 is in progress, the end point PT2 moves within the display area 200. The computing device 100 can thus determine dynamically the selection path 210 which corresponds to the path defined by the end point PT2's movement, starting from the initiation point PT1.

However, in accordance with the selected second mode ME2, the computing device 100 confines (S8, FIG. 6) in this case the selection path 210 within the target block section BL2 to prevent selection of any graphical object OB outside said target block section BL2.

In other words, the selection path 210 drawn by the user is limited or restrained by the computing device 100 into the target block section BL2 which contains the initiation point PT1 located in step S4. Even if the user selection gesture GT1 moves outside the target block section BL2, the computing device 100 blocks the selection path 210 within the target block section BL2 such that no graphical object OB outside said target block section can be selected. In the second mode ME2, only selection of one or more graphical objects OB (i.e. OB8 in this example) present within the target block section BL2 can thus be made.

More specifically, as shown in FIG. 16, the user may perform the user selection gesture GT1 by interacting with the input surface 104, as already described. In this example, this user interaction is a point of contact (or point of interaction) PT3 which moves forward on the input surface 104, starting from the initiation point PT1 detected in S4. As can be seen in FIG. 16, when the computing device 100 operates according to the second mode ME2, the path of the point of contact applied by the user over time on the input surface 104 is not necessarily identical to the selection path 210 determined in S10, although the selection path 210 is still determined based on the user selection gesture GT1. In the example of FIG. 16, the user selection gesture GT1 moves from the initiation point PT1 outside the target block section BL2, as represented by the point of contact PT3. In accordance with the second mode ME2, the computing device 100 determines (S10) the selection path 210 dynamically so that it remains confined within the target block section BL2. Although it is limited into the target block section BL2, the selection path 210 still reflects (to some extent) the user selection gesture GT1 over time (but the user selection gesture GT1 and the selection path 210 are not identical). The selection path 212 is guided by the boundary of the target block section BL2.

As can be seen in FIG. 16, upon detecting that the user selection gesture GT1 moves from the target block section BL2 into the structured text section 202, the computing device 100 determine a selection path 210 which roughly reflects the user selection gesture GT1 to the extent that it remains blocked within the target block section BL2.

In the present example shown in FIG. 16, the selection path 210 is determined as a projection of the user selection gesture GT1 along the border of the target block section BL2, although other embodiments are possible. When the point of contact PT3 travels outside and around the target block section BL2, the end point PT2 moves along the border of the target block section BL2 in correspondence with the point of contact PT3.

The computing device 100 then performs the steps S12 to S20 as already described with reference to FIGS. 8-13 in the first mode ME1.

As already described, as long as the user selection gesture GT1 is in progress, the graphical object selection may vary over time. The computing device 100 may thus reiterate steps S7-S14 over time in accordance with the second mode ME2 selected in step S6 as long as no pen up event is detected (S18). By reiterating steps S7-S14, the computing device 100 dynamically updates (S12) the selection area 212 based on the current selection path 210, thereby also updating (S14) the graphical object selection based on the selection area 212. To this end, the data structure 113 may be updated to keep an up-to-date selection of the one or more graphical objects OB being currently selected by the user selection gesture GT1.

Figure 17:
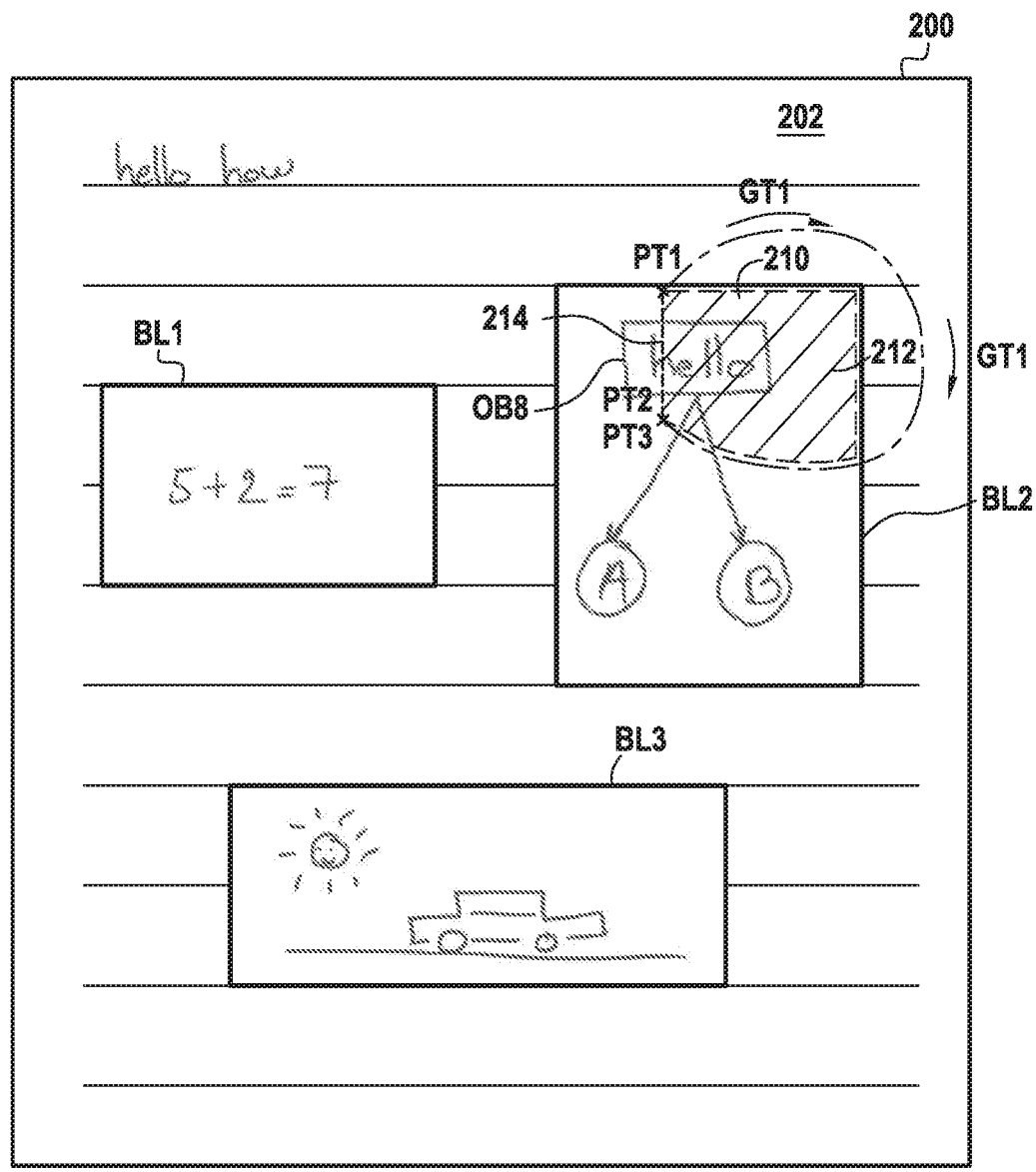

As shown in the example of FIG. 17, upon detecting that the user selection gesture GT1 continues to move forward within the structured text section BL2 and then drifts back in a curvature path into the target block section BL2, the computing device 100 draws (S10) dynamically a corresponding selection path 210 confined within the target block section BL2, determines (S12) a connection line 214 joining the end point PT2 and the initiation point PT1 of the selection path 210, determines (S12) a selection area 212 formed by the selection path 210 and the connection line 214, and selects (S14) the graphical object OB8 which is partially contained within the selection area 212. As a result, a visual feedback representing selection of the graphical object OB8 is provided on the display device 102.

In the embodiment described above, the step S14 (FIG. 6) of identifying each selected graphical object OB is performed, in the first mode ME1 and second mode ME2, before detecting in S18 that the user selection gesture GT1 ends. As a result, the currently selected objects OB can be identified (S14) dynamically while the user is performing the user selection gesture GT1 with the input surface 104.

In a variant, when the second mode ME2 is implemented (and possibly also in the first mode ME1), the identifying step S14 is performed only once the user selection gesture GT1 ends. It means that the computing device 100 operating in the second mode ME2 does not identify (S14) which graphical object OB is selected while the user selection gesture GT1 is still in progress. It is upon detecting (S18) termination of the user selection gesture GT1, that the computing device 100 performs the identifying step S14 as already described. This variant allows to save resource cost incurred by identifying a current selection repeatedly over time, in particular with graphical objects such as mathematic formula, drawings or the like.

Further, as shown in the example of FIG. 16, the computing device 100 may be configured to determine a selection area 212 based on the selection path 210 even if the selection path 210 forms a straight line (that is, even when the selection path 210 is identical to the connection line 214 joining the initiation point PT1 and the end point PT2).

Figure 18:
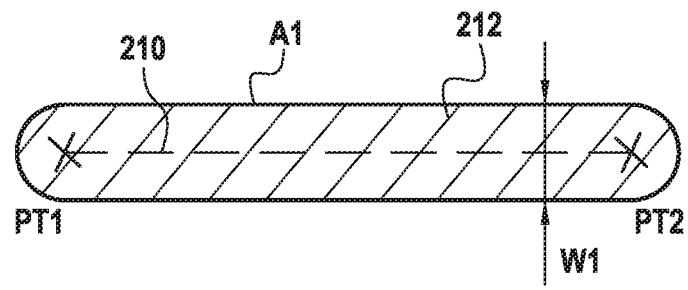
FIGS. 18-19 depict schematically graphical objects in particular embodiments of the present invention.
Figure 19:
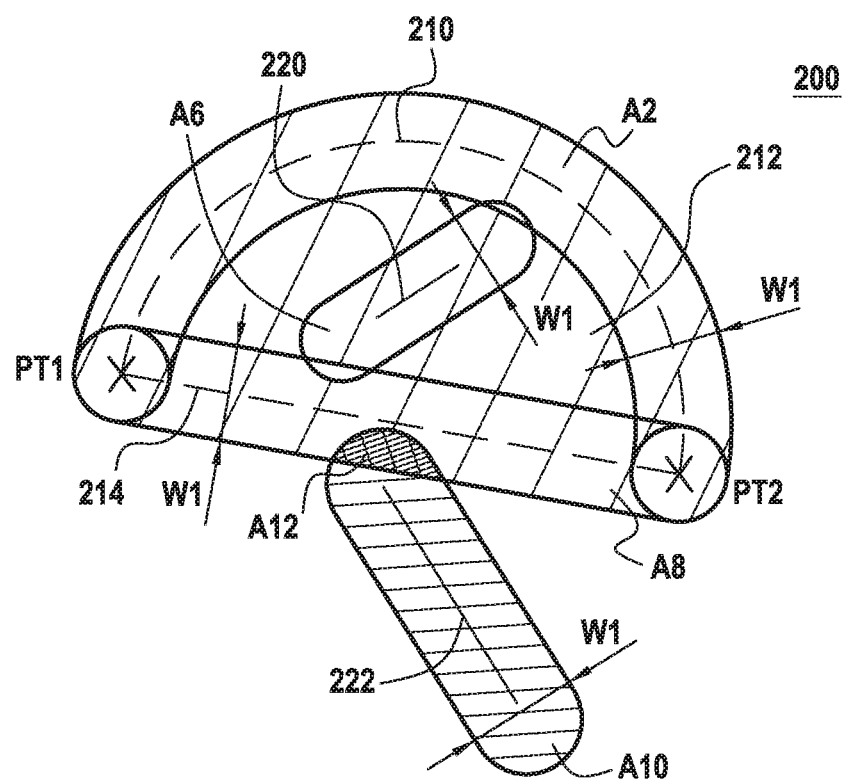

As depicted in the examples of FIGS. 18 and 19, the selection path 210 and the connection line 214 may be represented in the display area 200 by two respective strokes of digital ink having a predefined stroke width W1 (more than zero), the selection area 212 being defined collectively by the selection path 210 and the connection line 214 so that said selection area 212 includes the area occupied by the selection 210 path and the connection line 214.

For instance, as shown in FIG. 18, in a case where the selection path 210 forms substantially a straight line from the initiation point PT1 to the end point PT2, the computing device 100 may determine in S12 (FIG. 6) that the selection area 212 is formed by the area A1 occupied by the selection path 210. In other words, the selection path 210 defines in itself a minimum selection area 212 formed by a digital ink stroke of a width W1.

In the example shown in FIG. 19, the selection area 212 is formed collectively by:
the area A2 of the selection path 210;
the area A8 of the connection line 214; and
the area formed by the selection path 210 and the connection line 214.

In this example, the selection in S14 (FIG. 6) is thus based on an area intersection (in contrast to a line intersection mechanism). The area occupied by each graphical object OB is also taken into account to determine in 14 if it is contained at least partially within the selection area 212. Each stroke forming all or part of a graphical object OB has for instance a width W1. At present, the strokes 220 and 222 thus occupy respective areas A6 and A10.

Accordingly, the stroke 220 in this example is determined in S14 (FIG. 6) to be part of the selection since it is positioned within the selection area 212. Additionally, the stroke 222 is also determined in S14 (FIG. 6) to be part of the selection since it is partially contained in the area A8 which forms part of the selection area 212. In other words, the stroke 222 is selected as a result of the area intersection A12 which is commonly shared by the area A8 of the stroke 214 and the area A10 of the stroke 222.

As previously described in particular embodiments, each graphical object OB which is at least partially positioned within the selection area 212 is selected by the computing device 100 as part of the current selection. In a particular embodiment, even if a block section BL is empty (i.e. does not contain any graphical object OB), then the entire— empty—block section BL is still selected upon detecting that there is an intersection of the selection area 212 with a border of the block section.

The present invention allows selecting and editing hand-drawn graphical objects in a flexible and efficient manner on a computing device. Two different operating modes ME1/ME2 are operable to allow the user to make an easy and accurate selection of any graphical objects that he may wish to manipulate for any appropriate purpose, such as editing or the like. In particular, the first mode ME1 allows a free and easy selection of any graphical objects OB present in a display area since no localization restriction is imposed on the selection path while the user selection part is being performed. On the other hand, the second mode ME2 permits a restricted selection within a particular block section in which the user selection gesture has started, thereby allowing a quick selection even if the user selection gesture performed by the user is not accurate.

Selection of graphical objects may be carried out without the need for complex or hard to remember gestures. The user may easily remember the procedure for performing a graphical object selection.

Further, as previously described, the computing device 100 may store a respective rank RK assigned to each of the graphical objects OB present in the display area 200, these ranks RK being ordered according to a rank order (FIG. 2). In a particular embodiment, the selection module MD4 is configured to:
determine the rank of each graphical object OB currently being selected in S14 (FIG. 6) within the selection area;
identify any not-yet-selected graphical object OB having a rank RK comprised between the respective ranks RK of two selected graphical objects OB according to said rank order; and
include each identified not-yet-selected graphical object OB into the selection.

The computing device 100 may for instance determine a first and last graphical object OB among the current selection based on the respective rank RK of each selected graphical object OB. Assuming that the graphical objects OB are ranked according to the following order: OB1, OB2, OB5, OB8, OB10 and OB11, if the computing device 100 detects that the graphical objects OB1, OB5 and OB8 are selected, it will thus deduce that the first and last graphical objects according to the predetermined order are respectively OB1 and OB8 and will thus include OB2 into the selection even though it was not at least partially contained in the selection area 212. Adding into the selection any not-yet-selected graphical object having a rank placed between two selected graphical object in the rank order, facilitates selection by the user of all graphical objects OB which are likely to be of interest to him/her.

In a particular example, each graphical object OB are ranked in a particular order from top to bottom and from left to right within the display area 200.

It should be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved.

The present invention having been described in particular embodiments, it is clear that it is susceptible to numerous modifications and embodiments within the ability of those skilled in the art, in accordance with the scope of the appending claims. In particular, the skilled person may contemplate any and all combinations and variations of the various embodiments described in this document that fall within the scope of the appended claims.

The invention claimed is:

1. A computing device comprising:
an input surface for hand-drawing graphical objects including text and non-text objects;
a display device for displaying in a display area a plurality of said graphical objects in digital ink, said display area comprising:
a structured text section containing at least one text object arranged according to a guideline pattern, and
at least one block section, distinct from the structured text section, containing at least one text or non-text object;
a locator for locating an initiation point in the display area from which starts a user selection gesture performed with the input surface to define a selection area; and
a selector for determining, based on the user selection gesture, a selection path forming said selection area in the display area and for selecting each graphical object contained at least partially within said selection area, said selector being configured to operate as a function of said locating of the initiation point such that:
if the initiation point is located in the structured text section, the selector operates according to a first mode by allowing the selection path to be drawn in the display area to select any graphical object of the structured text section and of said at least one block section; and
if the initiation point is located within a target block section among said at least one block section, the selector operates according to a second mode by confining the selection path within said target block section to prevent selection of any graphical object outside said target block section.

2. The computing device according to claim 1, wherein in the first mode the selector is configured to select any graphical object, within the structured text section and within said at least one block section, which is at least partially contained in said selection area.

3. The computing device according to claim 1, wherein in the second mode the selector is configured to authorize only selection of any graphical object within said target block section.

4. The computing device according to claim 1, wherein the selector is configured to determine a connection line joining the initiation point and an end point of the selection path to thereby form the selection area.

5. The computing device according to claim 4, wherein the selector is configured to:
detect a current end point while the selection path is still being drawn;
define dynamically the connection line joining the initiation point and the current end point;
determine the selection area formed by the selection path and the connection line; and
select each graphical object at least partially contained in said selection area.

6. The computing device according to claim 4, wherein the selection path and the connection line are represented on the display device by two respective strokes of digital ink having a predefined stroke width, the selection area being defined collectively by the selection path and the connection line so that said selection area includes the area occupied by the selection path and the connection line.

7. The computing device according to claim 1, wherein the selector is configured, in the first and second mode, to select each graphical object which presents a relative proportion within the selection area exceeding a predetermined threshold.

8. The computing device according to claim 1, wherein the display device is configured to generate a visual feedback for each graphical object being currently selected by the user selection gesture while the selection path is being drawn.

9. The computing device according to claim 1, comprising an editor for editing collectively as a block each graphical object selected by the selector.

10. The computing device according to claim 1, wherein the user selection gesture is an interaction of a user's body part with the input surface which causes generation of a stroke of digital ink on the display device along the selection path.

11. The computing device according to claim 1, wherein said at least one block section comprises at least one of the following:
a drawing block section containing at least one drawing object;
a mathematic block section containing at least one mathematic object representative of a mathematic formulation; and
a diagram block section containing text and non-text objects.

12. The computing device according to claim 1, comprising a storage for storing a respective rank for each of said graphical objects present in the display area, the ranks of said graphical objects being ordered according to a rank order,
wherein the selector is configured to:
determine the rank of each graphical object currently being selected within the selection area;
identify any not-yet-selected graphical object having a rank comprised between the respective ranks of two selected graphical objects according to said rank order; and
include each identified graphical object into the selection.

13. The computing device according to claim 1, wherein the structured text section forms a background of the display area with guidelines for guiding text input, and wherein the at least one block section is displayed over said background.

14. A method for processing handwriting input elements on a computing device, the computing device comprising a processor, a memory and at least one non-transitory computer readable medium for recognizing input under control of the processor, the method comprising:
displaying in a display area of a display device a plurality of graphical objects in digital ink, said display area comprising:
a structured text section containing at least one text object arranged according to a guideline pattern, and
at least one block section, distinct from the structured text section, containing at least one text or non-text object;

locating an initiation point in the display area from which starts a user selection gesture performed with the input surface to define a selection area;

determining, based on the user selection gesture, a selection path forming said selection area in the display area; and selecting each graphical object contained at least partially within said selection area;

wherein the selection path is determined as a function of a result of said locating such that:

if the initiation point is located in the structured text section, operating according to a first mode by allowing the selection path to be drawn in the display area to select any graphical object of the structured text section and of said at least one block section; and if the initiation point is located within a target block section among said at least one block section, operating according to a second mode by confining the selection path within said target block section to prevent selection of any graphical object outside said target block section.

15. A non-transitory computer readable medium having a computer readable program code embodied therein, said computer readable program code adapted to be executed to implement a method for processing handwriting input elements on a computing device, the computing device comprising a processor, a memory and at least one non-transitory computer readable medium for recognizing input under control of the processor, the method comprising:

displaying in a display area of a display device a plurality of graphical objects in digital ink, said display area comprising:

a structured text section containing at least one text object arranged according to a guideline pattern, and at least one block section, distinct from the structured text section, containing at least one text or non-text object;

locating an initiation point in the display area from which starts a user selection gesture performed with the input surface to define a selection area;

determining, based on the user selection gesture, a selection path forming said selection area in the display area; and selecting each graphical object contained at least partially within said selection area;

wherein the selection path is determined as a function of a result of said locating such that:

if the initiation point is located in the structured text section, operating according to a first mode by allowing the selection path to be drawn in the display area to select any graphical object of the structured text section and of said at least one block section; and if the initiation point is located within a target block section among said at least one block section, operating according to a second mode by confining the selection path within said target block section to prevent selection of any graphical object outside said target block section.

* * * * *